(12) United States Patent
Aizawa

(10) Patent No.: US 7,075,568 B2
(45) Date of Patent: Jul. 11, 2006

(54) DIGITAL CAMERA, SYSTEM, AND METHOD FOR CAPTURING AND STORING AN IMAGE, AND USING AN EVENT SIGNAL TO INDICATE A CHANGE IN THE CONTENT STORED IN A MEMORY

(75) Inventor: Takashi Aizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 09/976,094

(22) Filed: Oct. 15, 2001

(65) Prior Publication Data
US 2002/0063781 A1 May 30, 2002

(30) Foreign Application Priority Data
Oct. 19, 2000 (JP) ........................ 2000/320097

(51) Int. Cl.
*H04N 5/232* (2006.01)

(52) U.S. Cl. ............................... 348/211.99; 348/207.1
(58) Field of Classification Search .............. 348/207.1, 348/143, 552, 222.1, 231.99, 231.1, 211.99, 348/211.1, 211.3, 211.4, 211.8, 211.9, 211.13, 348/211.14
See application file for complete search history.

(56) References Cited
U.S. PATENT DOCUMENTS
5,689,442 A * 11/1997 Swanson et al. ............ 348/143
6,300,976 B1 * 10/2001 Fukuoka ................. 348/231.99
6,429,896 B1 * 8/2002 Aruga et al. ........... 348/231.99

FOREIGN PATENT DOCUMENTS
JP 2000-137796 5/2000

* cited by examiner

*Primary Examiner*—Aung Moe
(74) *Attorney, Agent, or Firm*—Fitzpatrick, Cella, Harper & Scinto

(57) ABSTRACT

A digital camera of a digital camera system includes an image capture unit and a storing unit for storing the captured image in a memory. A computer of the system issues a capture command for capturing an image by the digital camera or a delete command for deleting the image stored in the memory. The digital camera generates an event signal indicating a change in stored content in the memory by a common sequence when stored content is changed in response to the capture or delete commands and when the stored content is changed in response to a digital camera operation. The computer issues a control command for collecting the stored content by a common sequence in response to the event signal when the stored content is changed in response to the capture or delete commands and when the stored content is changed in response to a digital camera operation.

25 Claims, 25 Drawing Sheets

FIG. 4

| | EventID | Parameters |
|---|---|---|
| (1) | UpdateCFData | None |
| (2) | ChangeFileAttrib | D:¥Canon¥DCIM¥100Canon¥img00011.jpg |
| (3) | AddFile | D:¥Canon¥DCIM¥100Canon¥img00011.jpg |
| (4) | ChangeReleaseParams | None |
| (5) | ChangeReleaseParam | Tvyalue |
| (6) | ChangeReleaseParam | Tvyalue 1/250 |
| (7) | ReleaseEvent_Thumbnail | ReleaseEventParam |
| (8) | ReleaseEvent_FullView | ReleaseEventParam |

FIG. 7A

| SequenceID |
| DataSize |
| DataFormat |

FIG. 7B

| SequenceID |
| DataSize |
| DataFormat |
| InternaFailPath |

FIG. 7C

| InternaFailPath |
| DataSize |
| DataFormat |

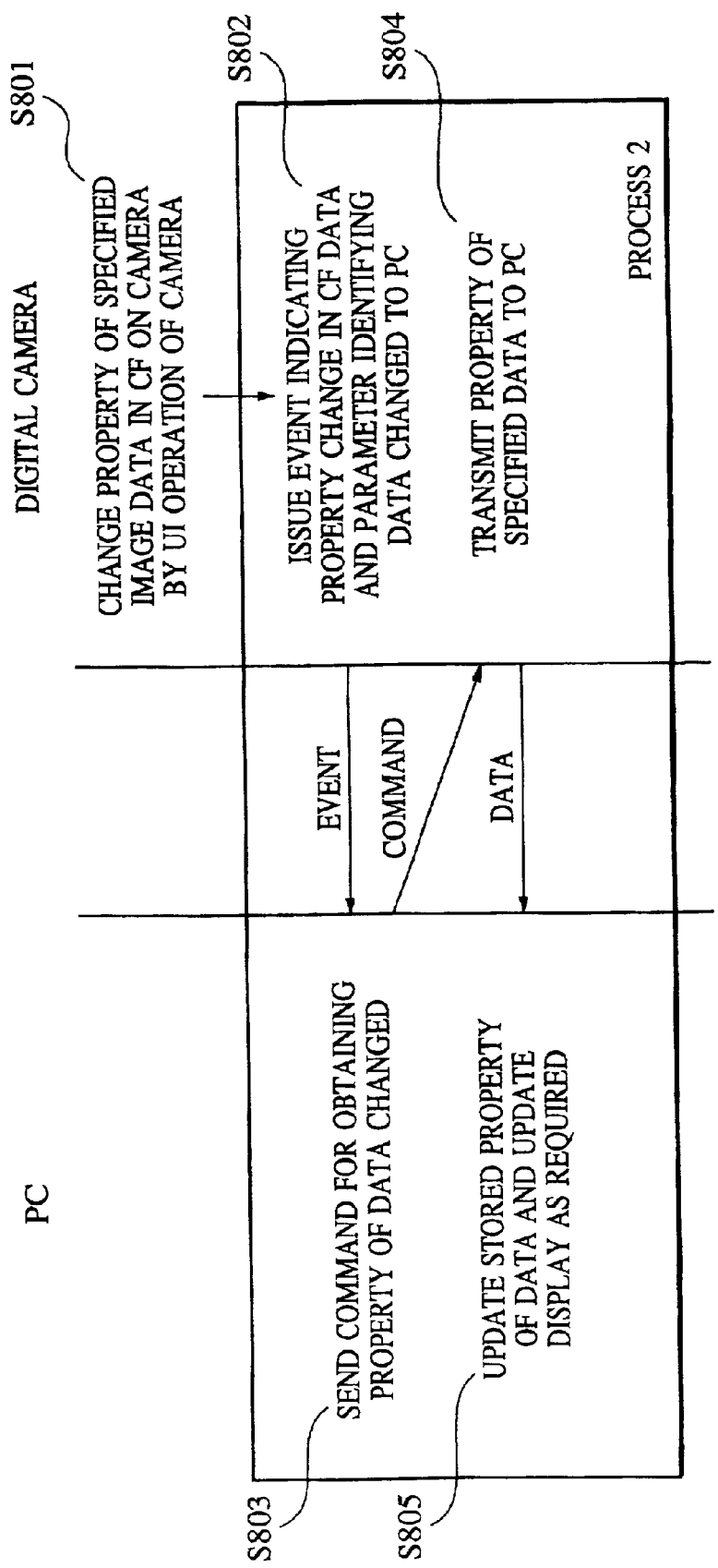

FIG. 12

| | |
|---|---|
| unsigned char | CaptureMode, |
| unsigned char | CompQuality; |
| unsigned char | FullViewFileFormat; |
| unsigned char | ImageSize; |
| unsigned short | SelfTimer; |
| unsigned char | StrobeSetting; |
| unsigned char | Beep; |
| unsigned char | ExposureMode; |
| unsigned char | ImageMode; |
| unsigned char | DriveMode; |
| unsigned char | EZoom; |
| unsigned char | MLWeiMode; |
| unsigned char | AFDistance; |
| unsigned short | FocusPointSetting; |
| unsigned char | WhiteBalanceSetting; |
| unsigned char | SlowShutterSetting; |
| unsigned char | AFMode; |
| unsigned char | ImageStabilization; |
| signed char | Contrast; |
| signed char | ColorGain; |
| signed char | Sharpness; |
| signed char | Sensitivity; |
| unsigned short | ParameterSet; |
| unsigned short | ISO; |
| unsigned short | Av; |
| unsigned short | Tv; |
| unsigned char | ExposureCompensation; |
| unsigned char | FlashCompensation; |
| unsigned char | AebExposureCompensation; |
| unsigned char | EFLensID; |
| unsigned short | AvOpen; |
| unsigned short | AvMax; |
| unsigned short | FocalLenght; |
| unsigned short | FocalLenghtTele; |
| unsigned short | FocalLenghtWide; |
| unsigned short | FocalLenghtDenominator; |

FIG. 19A

| NumOfEvent | |
|---|---|
| KindOfEvent | Flag |
| KindOfEvent | Flag |

FIG. 19B

| Add | |
|---|---|
| NumOfEvent | |
| KindOfEvent | Flag |
| KindOfEvent | Flag |

FIG. 20A

| Thumbnail |
|---|
| FullView |
| Sound |
| SaveCF |
| ⋮ |

FIG. 20B

| Add 1 | Thumbnail |
|---|---|
| Add 1 | FullView |
| Add 2 | Thumbnail |
| Add 2 | FullView |
| | ⋮ |

DIGITAL CAMERA, SYSTEM, AND METHOD FOR CAPTURING AND STORING AN IMAGE, AND USING AN EVENT SIGNAL TO INDICATE A CHANGE IN THE CONTENT STORED IN A MEMORY

BACKGROUND OF THE INVENTION

1. Field of the Invention

The present invention relates to a digital information input system, and more specifically to a digital information input system including an input apparatus such as a digital camera for capturing a motion picture or a still picture, and a personal computer.

2. Description of the Related Art

Hitherto, image data and sound data, etc., captured by a digital camera have been recorded on a recording device such as a flash memory incorporated in the digital camera or on a recording medium detachable from the digital camera.

Also, a system has been proposed and made into commercial products in which a digital camera and an information processing apparatus such as a personal computer (hereinafter PC) are connected, for example, via a cable, so that information such as image data recorded on an internal recording device of the digital camera or a recording medium detachable from the digital camera can be transferred to the PC.

For example, in a system in which a PC and a digital camera are connected, a list of image data recorded on a recording medium on the digital camera can be displayed on the PC for the user, so that an image specified by the user can be transferred and stored or displayed on the PC.

In another system, by an operation of an input apparatus such as a digital camera connected to a PC, image information is recorded in the input apparatus, and the image information which has been recorded is then transferred and stored or displayed on the PC.

Furthermore, in Japanese Patent Laid-Open No. 2000-137796 by the assignee of this application, a system is proposed in which an input apparatus is connected to a PC so that image information which has been captured can be directly transferred to the PC without storing the image information in the input apparatus.

In the conventional systems in which a digital camera is connected to a PC, however, the input apparatus such as the digital camera typically has an operation unit for switching to a PC connection mode, so that the user uses the digital camera in connection with the PC after entering the PC connection mode by operating the operation unit, allowing operation only from the PC while prohibiting operation of the input apparatus when the connection is on. Even if the operation unit for entering the PC connection mode is not provided on the input apparatus, upon a connection being made between the PC and the input apparatus, for example, via a cable, operation of the input apparatus has typically been prohibited while allowing operation only from the PC.

This is primarily because it is difficult to maintain data consistency between the input apparatus such as a digital camera and an application software on the PC when a change is made to information in the input apparatus by an operation of the input apparatus while the information in the input apparatus is being referenced or used by the PC.

Furthermore, even if a system allows capturing of an image both from a PC and an information input apparatus such as a camera connected to the PC, because the capture sequence initiated by the PC and the capture sequence initiated by the camera have been different, the load of an application software on the PC has been large, and it has been difficult to equivalently handle, for example, the process of transferring a captured image directly to the PC without recording the image on a recording medium such as a flash memory on the camera.

That is, in a system in which an input apparatus is connected to a PC, the user suffers from increased system restrictions compared to the case where the input apparatus is individually alone.

As communications go increasingly wireless, it is desired that the user be allowed to exchange information transparently between an information processing apparatus such as a PC and an information input apparatus such as a digital camera.

SUMMARY OF THE INVENTION

Accordingly, it is an object of the present invention to provide an information input system, a digital camera system, and a controlling method therefor which overcomes the problems described above.

It is another object of the present invention to provide an information input system, a digital camera system, and a controlling method therefor which achieves, when an information processing apparatus such as a PC and an input apparatus such as a digital camera are connected (either connected physically via a cable or connected logically, for example, by wireless), an environment equivalent or superior to that in the case where the input apparatus is used alone. That is, the environment does not impose any restrictions on operations either from the PC or from the input apparatus for referencing or using information in the input apparatus or for operation and control of the input apparatus, such as capturing an image.

To these ends, according to one aspect of the present invention, a digital camera system including a digital camera, and a computer which is connected to the digital camera and which controls the digital camera, is provided. The digital camera has a capture unit arranged to capture an image and an image storing unit arranged to store the captured image in a memory. The computer has a command issuing unit arranged to issue a capture command for capturing an image by the digital camera or a delete command for deleting the image stored in the memory. In the digital camera system, the digital camera generates an event signal indicating a change in the content stored in the memory by a common sequence when the content stored in the memory is changed in response to the capture command or the delete command and when the content stored in the memory is changed in response to an operation of the digital camera. The computer issues a control command for collecting the content stored in the memory by a common sequence in response to the event signal when the content stored in the memory is changed in response to the capture command or the delete command and when the content stored in the memory is changed in response to an operation of the digital camera.

According to another aspect of the present invention, a digital camera which is connectable to a computer is provided. The digital camera includes a capture unit arranged to capture an image; an image storing unit arranged to store the captured image in a memory; a release switch arranged to request a capture to the capture unit; an operation unit arranged to request deletion of the image stored in the memory; and a control unit arranged to control the capture unit or the image storing unit upon receipt of a capture command or a delete command from a computer connected to the digital camera. The control unit generates an event signal indicating a change in the content stored in the memory by a common sequence when the content stored in the memory is changed in response to a capture by the release switch or an operation of the operation unit and when the content stored in the memory is changed in response to the capture command or the delete command.

According to still another aspect of the present invention, a method of controlling a computer which is connected to a digital camera and which controls the digital camera is provided. The method includes a first issuing step of issuing a capture command for capturing an image by the digital camera or a delete command for deleting an image stored in a memory of the digital camera; a receiving step of receiving event information indicating a change in the content stored in the memory of the digital camera from the digital camera; and a second issuing step of issuing a control command for collecting the content stored in the memory by a common sequence when the event information is issued in relation to a capture or deletion of image being executed in response to the command issued in the first issuing step and when the event information is issued in relation to a capture or deletion of image being executed in response to an operation of an operation unit of the digital camera.

According to yet another aspect of the present invention, an image processing system including an image information generating apparatus and an information processing apparatus for processing image information from the image information generating apparatus is provided. The image information generating apparatus includes an event information transmitting unit arranged to transmit event information indicating the type of a process executed in the image information generating apparatus. The information processing apparatus includes a processing request transmitting unit arranged to transmit a processing request to the image information generating apparatus in accordance with the event information transmitted from the event information transmitting unit.

The event information may include information indicating a change in an image stored in the image information generating apparatus, and the processing request may include a request for the image stored in the image information generating apparatus.

The image information generating apparatus may be a digital camera for capturing and storing an image.

According to a further aspect of the present invention, a digital camera which is connectable to a computer is provided. The digital camera includes a first transmitting unit that transmits event information relating to an operation executed in the digital camera to the computer; and a second transmitting unit that transmits data having been changed by the operation to the computer. The first transmitting unit transmits common event information when the operation is initiated by a command from the computer and when the operation is initiated by an input from an operation unit of the digital camera.

According to a still further aspect of the present invention, a method of controlling a computer which is connectable to a digital camera is provided. The method includes a first transmitting step for transmitting a command for executing a predetermined operation by the digital camera; a receiving step for receiving event information relating to the operation executed by the digital camera in response to the command transmitted; and a second transmitting step for transmitting a processing request to the digital camera in accordance with the event information received. The second transmitting step transmits the same processing request when the event information is generated in relation to the predetermined operation being executed in response to an input from an operation unit of the digital camera.

In accordance with the above, in a digital information system such as a digital camera system primarily for capturing a motion picture or a still picture, in particular, when a system including a processing apparatus such as a PC (personal computer) and an input apparatus such as a digital camera is implemented, restrictions associated with the connection between the processing apparatus and the input apparatus can be minimized. Accordingly, input and display of data, such as an image, by manipulating the digital camera from an application software on the PC, and input and display of data to the application software on the PC by a user's operation of the digital camera, can be seamlessly handled.

Furthermore, a system with improved usability, in which consistency between data in the camera and data in the PC can be maintained relatively easily, can be readily developed. In addition, the operation process, the display process, etc. can be individually set, allowing flexible system configuration for operation of input apparatus and usage of data in wireless communications and Internet connection environments expected to come.

Furthermore, it is to be understood that the objects of the present invention will also be achieved by supplying a storage medium on which the program code of software implementing the functionality of the above-described embodiments to a system or an apparatus, so that a computer (or a CPU or a MPU) in the system or the apparatus reads the program code stored in the storage medium to execute the program.

The storage medium for supplying the program code may be, for example, a floppy disk, a hard disk, an optical disk, a magneto-optical disk, a CD-ROM, a CD-R, a magnetic tape, a non-volatile memory card, a ROM, an EEPROM.

Furthermore, it will also be understood that as well as the functionality of the above-described embodiments may be implemented by the computer executing the program code, the functionality of the above-described embodiments may also be implemented by processes according to the program code being executed partially or entirely by an OS (operating system) which runs on the computer.

Furthermore, the advantages of the present invention can also be achieved by downloading a software program for implementing the present invention from a database on a network to a system or an apparatus by using a communications program.

Further objects, features and advantages of the present invention will become apparent from the following description of the preferred embodiments with reference to the attached drawings.

BRIEF DESCRIPTION OF THE DRAWINGS

FIG. 4 is a diagram showing the contents of events.

FIGS. 7A, 7B, and 7C are schematic diagrams showing Release Event Param structures.

FIG. 8 is a diagram showing a process for changing the property information of the image data in the digital camera by an operation of the digital camera shown in FIG. 2.

FIG. 12 is a diagram showing the capture setting parameters.

FIGS. 19A and 19B are schematic diagrams showing parameters of event generation commands.

FIGS. 20A and 20B are schematic diagrams of Event Table.

DESCRIPTION OF THE PREFERRED EMBODIMENTS

Digital camera systems according to embodiments of the present invention will be described below with reference to the accompanying drawings.

Figure 1:
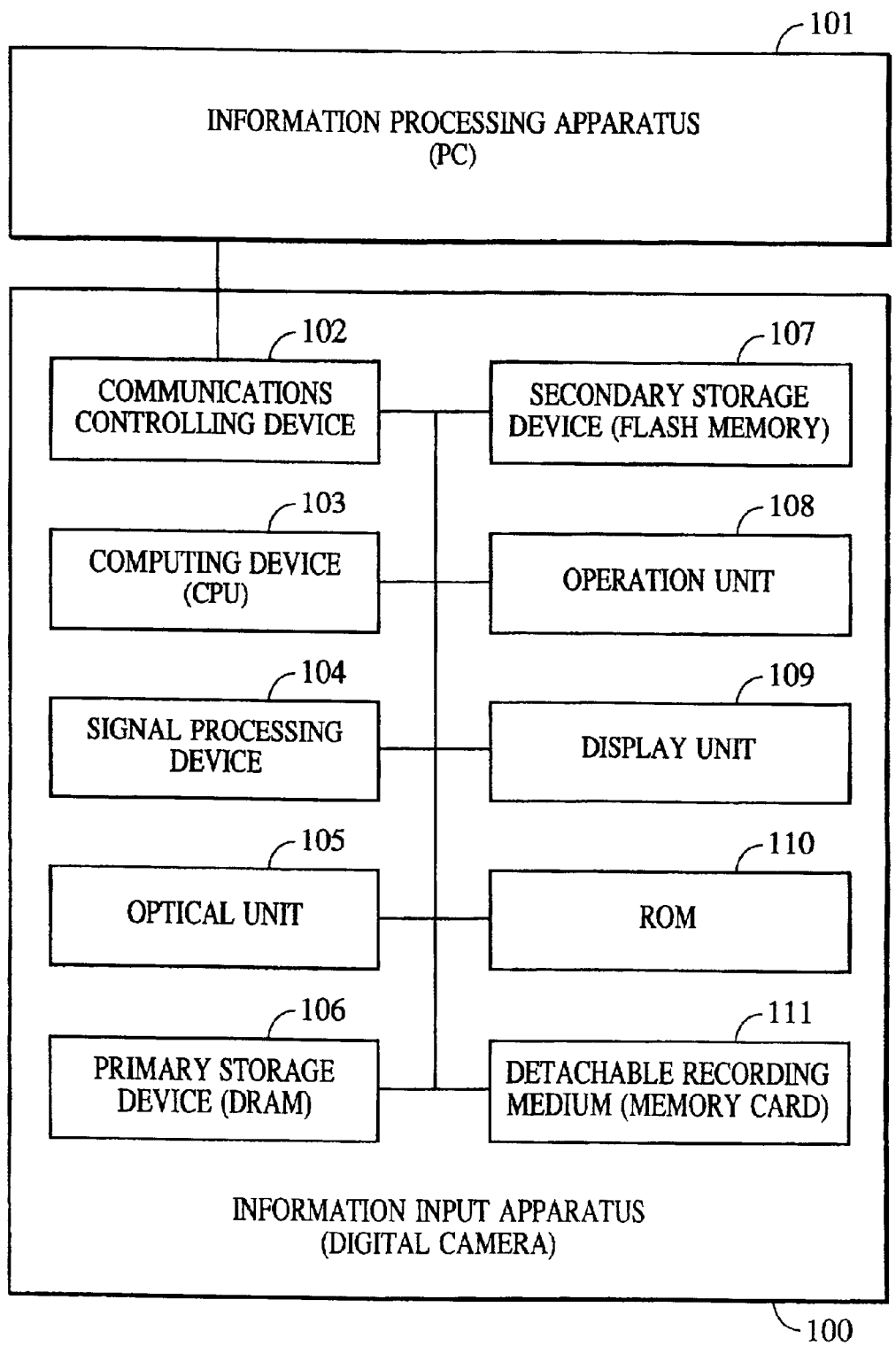
FIG. 1 is a block diagram of a digital camera system according to a first embodiment of the present invention.

FIG. 1 is a block diagram of a digital camera system according to a first embodiment of the present invention.

The digital camera system according to the first embodiment generally includes an information input apparatus 100 such as a digital camera (hereinafter digital camera 100), and an information processing apparatus 101. The information processing apparatus is typically a computer (hereinafter PC) which includes, although not shown, a computing device (CPU), a primary storage device (RAM), a secondary storage device (hard disk), operation devices (a keyboard and a mouse), a display device, etc.

The digital camera 100 includes an optical unit including a lens, a CCD, a driving circuit, etc.; a signal processing circuit 104 for processing image data, etc.; a computing device 103 such as a CPU; a primary storage device 106 such as a DRAM; a secondary storage device 107 such as an internal flash ROM; an operation member 108; a display device 109 such as an LCD; a read-only memory (ROM) 110 for storing programs, etc.; a detachable recording medium 111 such as a compact flash memory card; and a communications controlling device 102 for controlling communications with the PC 101.

Depending on the type of digital camera, the arrangement may be such that only one of the detachable recording medium 111 and the undetachable secondary storage device 107 is used.

Figure 2:
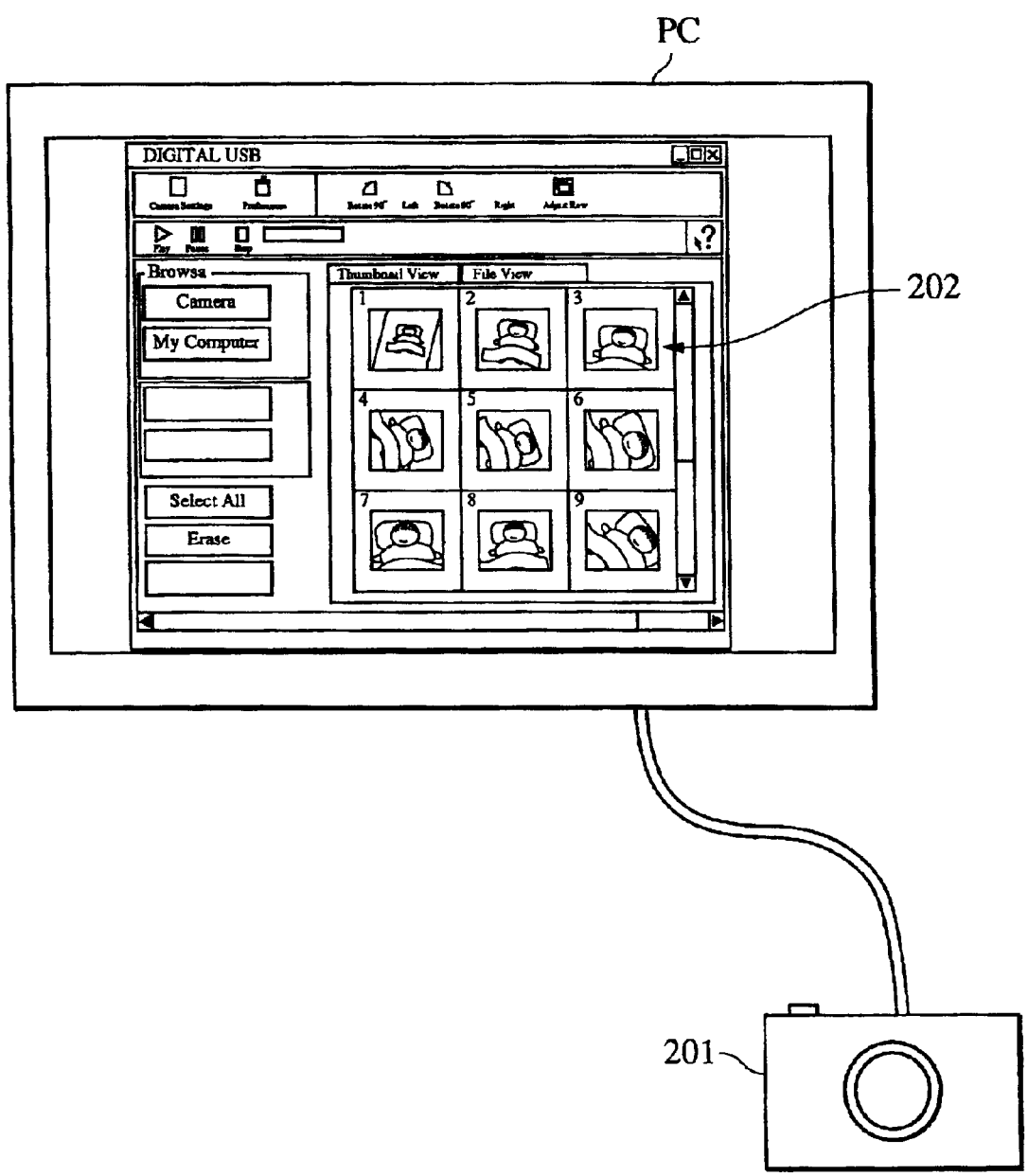
FIG. 2 is a schematic diagram showing the connection in the digital camera system.

FIG. 2 is a schematic diagram showing the connection status in the digital camera system. Digital camera 201 is constructed identically to the information input apparatus 100 shown in FIG. 1, and reference numeral 202 denotes a screen of an application software program which runs on a PC connected to the digital camera 201 via a USB (Universal Serial Bus) cable.

When the digital camera 201 is connected to the PC via the USB cable, the application software is activated on the PC, so that image data recorded in the secondary storage device 107 or the detachable recording medium 111 is transferred to the PC and a thumbnail thereof is displayed. That is, the application software 202 manages the display by referencing data stored within the digital camera 201 connected to the PC, updating the display when a change has been made to the data stored within the digital camera 201.

Figure 3:
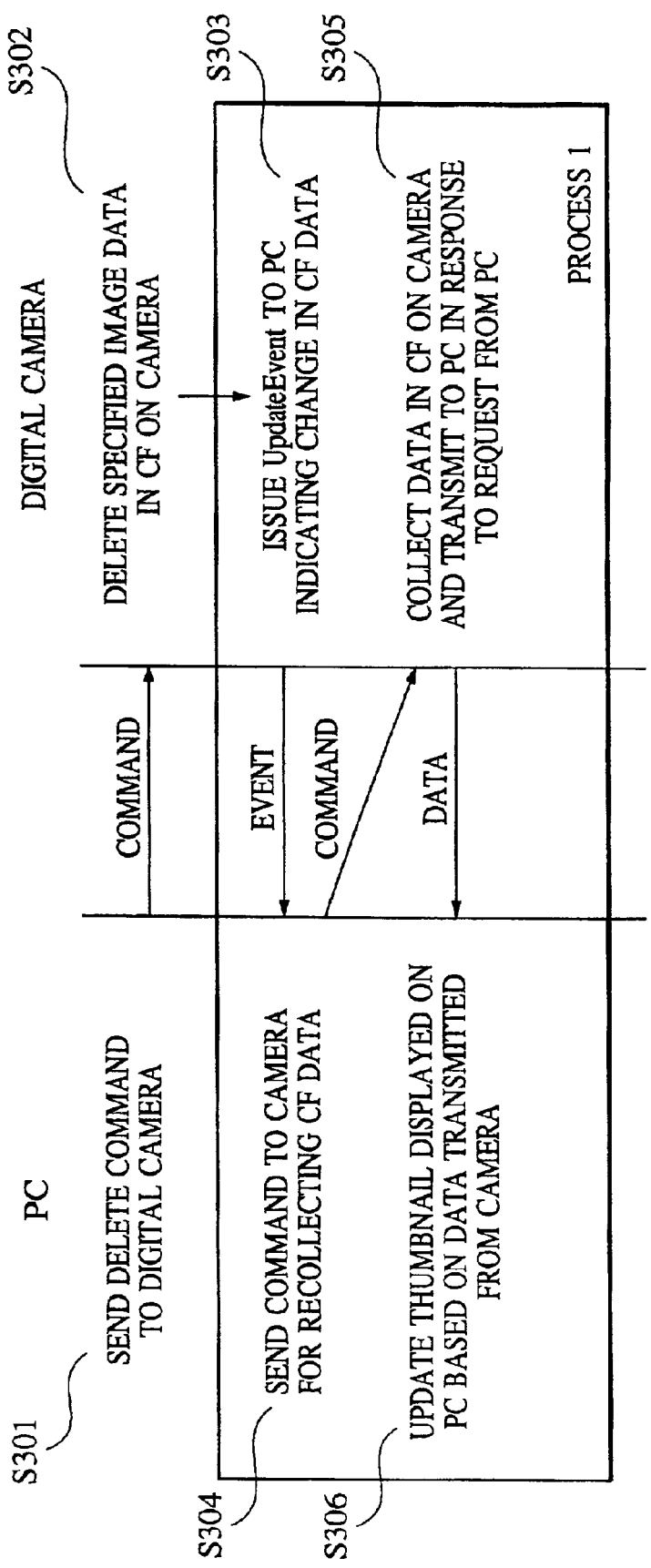
FIG. 3 is a flowchart showing a process for deleting image data in the digital camera by an operation of the application software on the PC shown in FIG. 2.

FIG. 3 is a flowchart showing a process for deleting image data in the digital camera 201 by an operation of the application software 202 on the PC shown in FIG. 2.

Referring to FIG. 3, first, by an operation of the application software 202, data specifying an image to be deleted and an image delete command are transmitted to the digital camera 201 (step S301). In response to the command, the digital camera 201 deletes the specified image data (step S302). Then, the digital camera 201 issues an Update event to the PC, indicating that a change has been made in the image data in the digital camera 201 (step S303).

FIG. 4 is a diagram showing the contents of events.

As shown in FIG. 4, each of the events is constituted of an Event_ID and an associated parameter. In this example, an event indicating an update of data in the compact flash (CF) card, as shown in (1) of FIG. 4, is issued and sent to the PC. In response to the event, the application software on the PC sends a command to the digital camera 201 for recollecting data in the digital camera 201 (step S304).

In this example, as shown in (1) of FIG. 4, the event does not include any parameter information. Thus, the application software on the PC is allowed only to know that a change has been made to the image data in the digital camera 201, but is not allowed to know which information in the digital camera 201 has been updated. Thus, the application software on the PC sends the command to the digital camera 201 for recollecting the image data within the camera (step S304), and in response to the command, the digital camera 201 collects the data and transmits the data to the PC (step S305). The application software on the PC updates the display based on the data received (step S306).

By using the event, the application software on the PC is not required to branch to different processes by determining which information in the digital camera 201 has been changed (e.g., an image deleted, the property information of an image changed, etc.), and the application software on the PC only has to execute the same process for any type of change. Thus, the process by the application software can be simplified.

Figure 5:
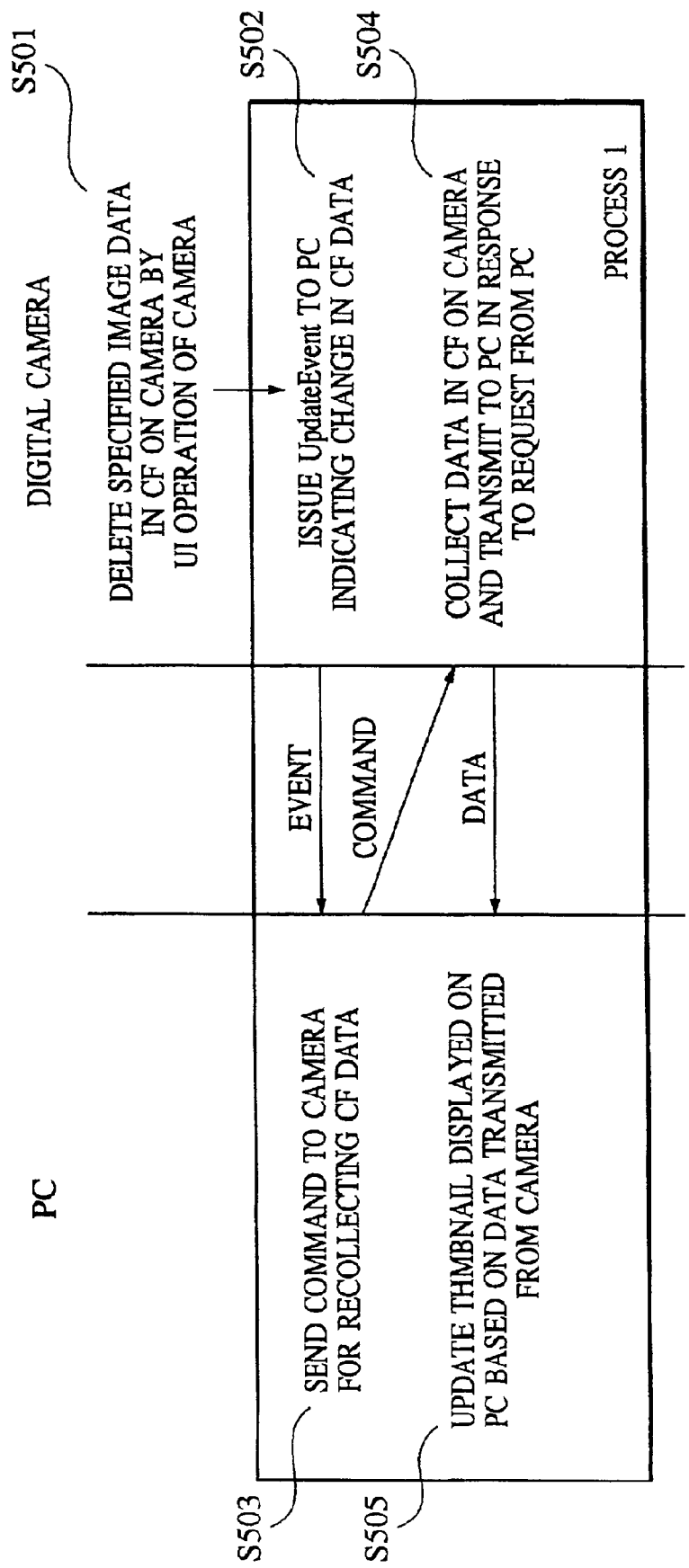
FIG. 5 is a flowchart showing a process for deleting image data in the digital camera by an operation of the digital camera.

FIG. 5 is a flowchart showing a process for deleting image data in the digital camera 201 by an operation of the digital camera shown in FIG. 2.

First, using the user interface (hereinafter UI) of the digital camera 201, including an operation unit and a display screen, specified image data in the digital camera 201 is deleted (step S501). Then, the digital camera 201 issues an Update event to the PC, indicating that a change has been made in the image data in the digital camera 201 (step S502). The event is the one described earlier with reference to (1) of FIG. 4, which notifies the PC that a change has been made in the image data stored in the digital camera 201.

In response to the event, the application software on the PC sends a command to the digital camera 201 for recollecting the image data in the digital camera 201 (step S503). In response to the command, the digital camera 201 collects the data and transmits the data to the PC (step S504). The application software on the PC receives the data and updates the display based thereon (step S505).

According to this embodiment, as described above, the process 1 for deleting an image in the digital camera 201 by an operation of the application software on the PC (steps S303 to S306 shown in FIG. 3) and the process 1 for deleting an image in the digital camera 201 by an operation of the digital camera 201 (steps S502 to 505 shown in FIG. 5) are the same.

Thus, when the image data in the digital camera 201 is being referenced by the application software on the PC, the same process is executed whether the data in the digital camera 201 is manipulated by an operation of the application software on the PC or the data in the digital camera 201 is manipulated by an operation of the digital camera 201, readily achieving consistency between the data in the digital camera 201 and the display by the application software on the PC.

Alternatively, an event which is generated in response to a change in the image data on the digital camera 201 may be as shown in (2) of FIG. 4. In this case, as opposed to the example described above, information indicating what kind of change has been made to the image data in the digital camera 201 is included in a parameter. The Event_ID indicates a change in the property of a file, and the parameter specifies the file which has been changed. The below describes an example in which the property of the image data in the digital camera 201 is changed using the event.

Figure 6:
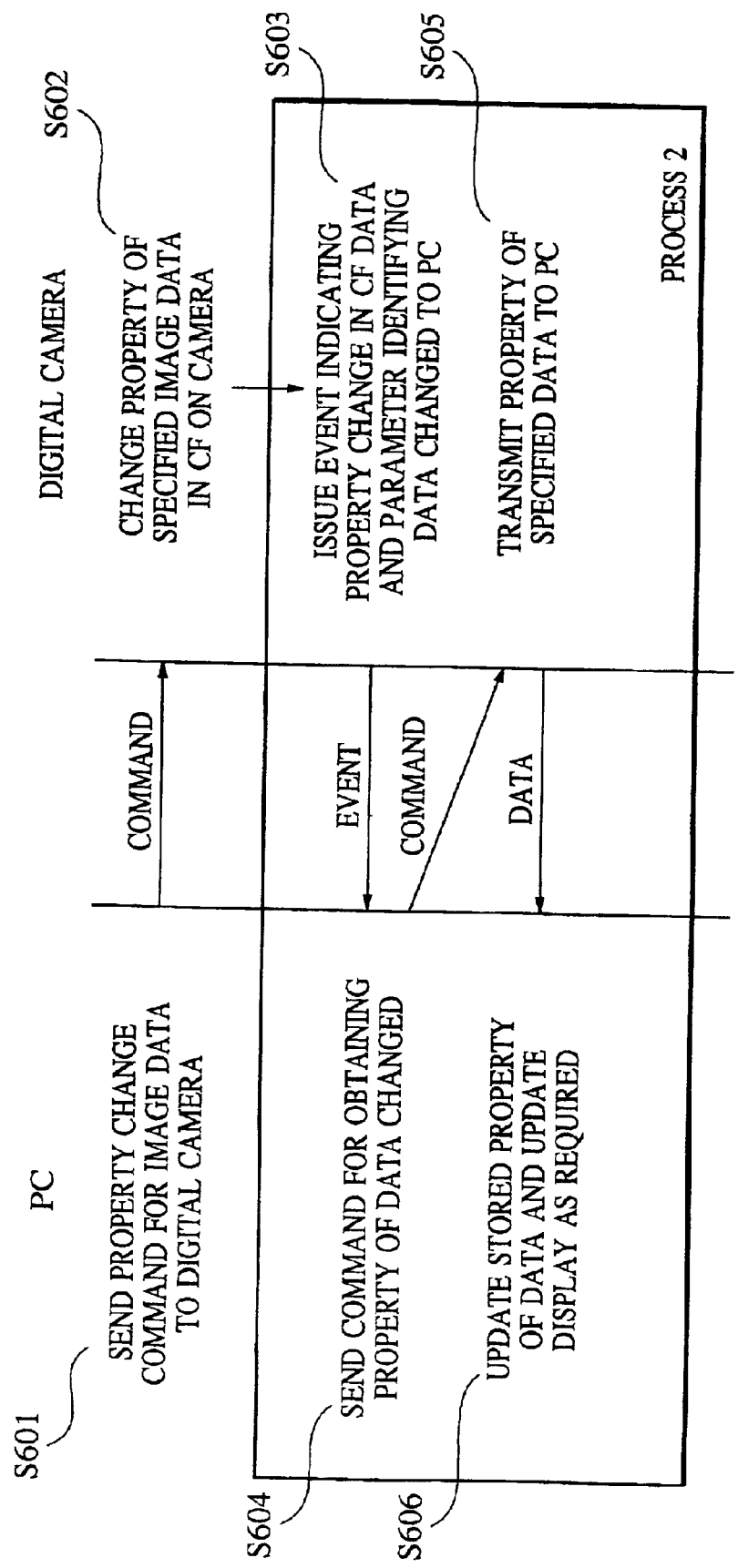
FIG. 6 is a diagram showing a process for changing the property of the image data in the digital camera by an operation of the application software on the PC.

FIG. 6 is a diagram showing a process for changing the image data in the digital camera 201 by an operation of the application software on the PC.

First, by operating the application software on the PC, data specifying an image for which the property is to be changed and an image data property change command are issued to the digital camera 201 (step S601). In response to the command, the digital camera 201 changes the property (e.g., write protect property) of the specified image data in the digital camera 201 (step S602). Then, a property change event indicating a change in the property of the image data in the digital camera 201, with a parameter indicating the file path of the image data which has been changed, is transmitted to the PC (step S603). Upon receiving the event and the parameter, the application software on the PC identifies the image data which has been changed based on the parameter, and issues a command for obtaining the property information thereof from the digital camera 201 (step S604). In response to the command, the digital camera 201 transmits the property information of the specified image data to the PC (step S605). Upon receiving the property data, the application software on the PC updates previous property information stored therein with the new property information received, and also updates the display as required.

FIG. 8 is a diagram showing a process for changing the property information of the image data in the digital camera 201 by an operation of the digital camera 201 shown in FIG. 2.

First, by an operation of the UI of the digital camera 201, the property information of specified image data in the digital camera 201 is changed (step S801). Then, a property change event indicating a change in the property of the image data in the digital camera 201, with a parameter indicating the file path of the image data which has been changed, is transmitted to the PC (step S802). Upon receiving the event and the parameter, the application software on the PC identifies the image file which has been changed based on the parameter, and issues a command for obtaining the property information thereof from the digital camera 201 (step S803). In response to the command, the digital camera 201 transmits the property information of the specified image data to the PC (step S804). Upon receiving the property data, the application software on the PC updates the previous property information stored therein with the new property information received, and also updates the display as required.

Also in this example, the process 2 shown in FIG. 6 (steps S603 to S606) and the process 2 shown in FIG. 8 (steps S802 to S805) are the same. That is, a change to the property information of image data can be handled by the same processing flow whether the change is initiated by the application software on the PC or from the UI of the digital camera, thus reducing the load of the application software. Furthermore, in this example, although the process is rather complex because the application software recognizes what kind of change has been made to the image data in the digital camera 201, obtains only the information which has been changed, and updates the information, the performance of the system is improved.

Furthermore, instead of changing the property of the image data, for example, an addition of an image can be similarly executed by letting the digital camera 201 generate a similar event and parameter as shown in (3) of FIG. 4.

Next, a second embodiment of the present invention will be described.

Figure 9:
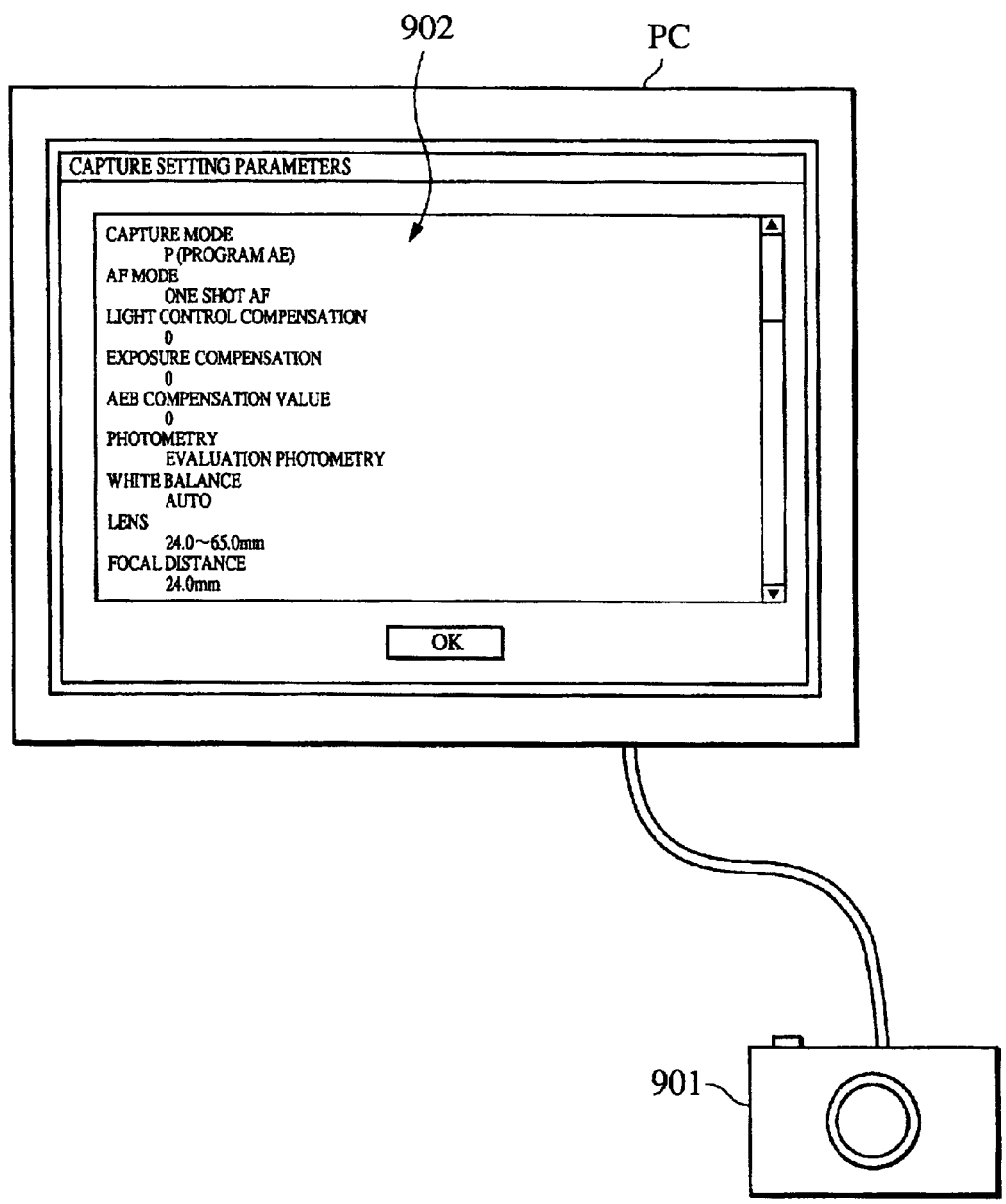
FIG. 9 is a schematic diagram of a second embodiment of the present invention.

FIG. 9 is a schematic diagram of the present invention.

Referring to FIG. 9, 901 is a digital camera which is an information input apparatus identical to the one in the first embodiment. Reference numeral 902 denotes an application software which runs on a PC connected to the digital camera 901 via a USB cable. According to this model, when the digital camera 901 is connected to the PC via the USB cable, the application software is activated on the PC, so that various capture setting parameters are retrieved and displayed. In this state, when a change is made to the capture setting by an operation of the UI of the digital camera 901, or when the capture setting in the digital camera 901 is changed by an operation of the application software on the PC, the display screen of the application software is updated in accordance therewith.

Figure 10:
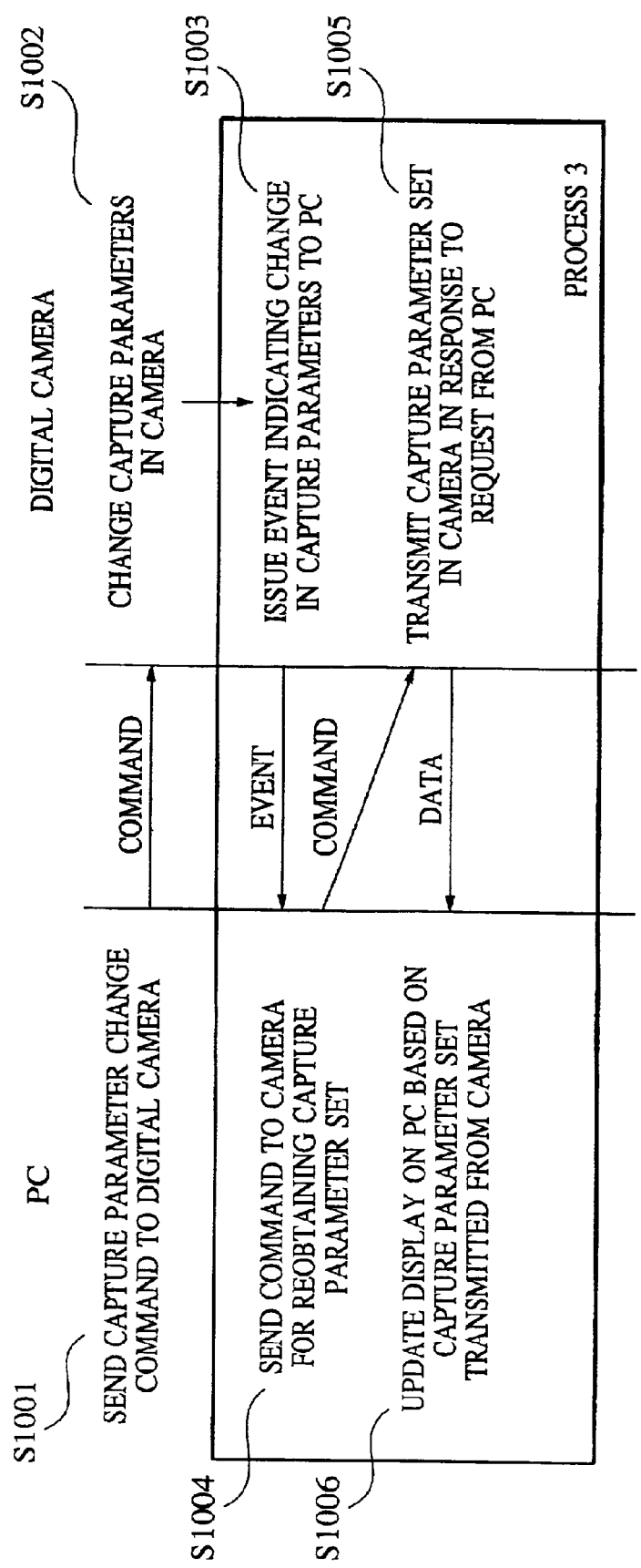
FIG. 10 is a diagram showing a process for changing the capture setting in the digital camera by an operation of the application software shown in FIG. 9.

FIG. 10 is a diagram showing a process for changing the capture setting in the digital camera 901 by an operation of the application software 902 shown in FIG. 9.

First, by an operation of the application software 902, a capture setting change command including a parameter indicating the content of the change is issued to the digital camera 901 (step S1001). In response to the command, the digital camera 901 changes the capture setting as specified (step S1002). Then, the digital camera 901 issues a Change Release Param event to the PC, indicating a change in the capture setting in the digital camera 901 (step S1003). In a manner similar to the one described earlier, the Change Release Param event also has an Event_ID and an associated parameter. In this example, the event shown in (4) of FIG. 4 is generated and transmitted to the PC. In response to the event, the application software on the PC sends a command to the digital camera 901 for obtaining the capture setting parameters in the digital camera 901. As shown in (4) of FIG. 4, the event does not include any parameter information. Thus, the application software on the PC is allowed only to know that a change has been made to at least one of the capture setting parameters (see FIG. 12) in the digital camera 901, but is not allowed to know which of the capture setting parameters in the digital camera 901 has been changed. Thus, the application software on the PC issues a command to the digital camera 901 for reobtaining the capture setting parameter set in the digital camera 901 (step S1004). In response to the command, the digital camera 901 transmits the new capture setting parameter set to the PC (step S1005). The application software on the PC updates the display based on the new capture setting parameters received (step S1006).

By using the event, the application software on the PC is not required to branch to different processes by determining which of the capture setting parameters in the digital camera 201 has been changed, and the application software on the PC only has to execute the same process regardless of which of the capture setting parameters has been changed. Thus, the process by the application software can be simplified. Furthermore, even if a plurality of the capture setting parameters are changed simultaneously, the updated information in the digital camera 901 can be reflected on the application software on the PC by a single process.

Figure 11:
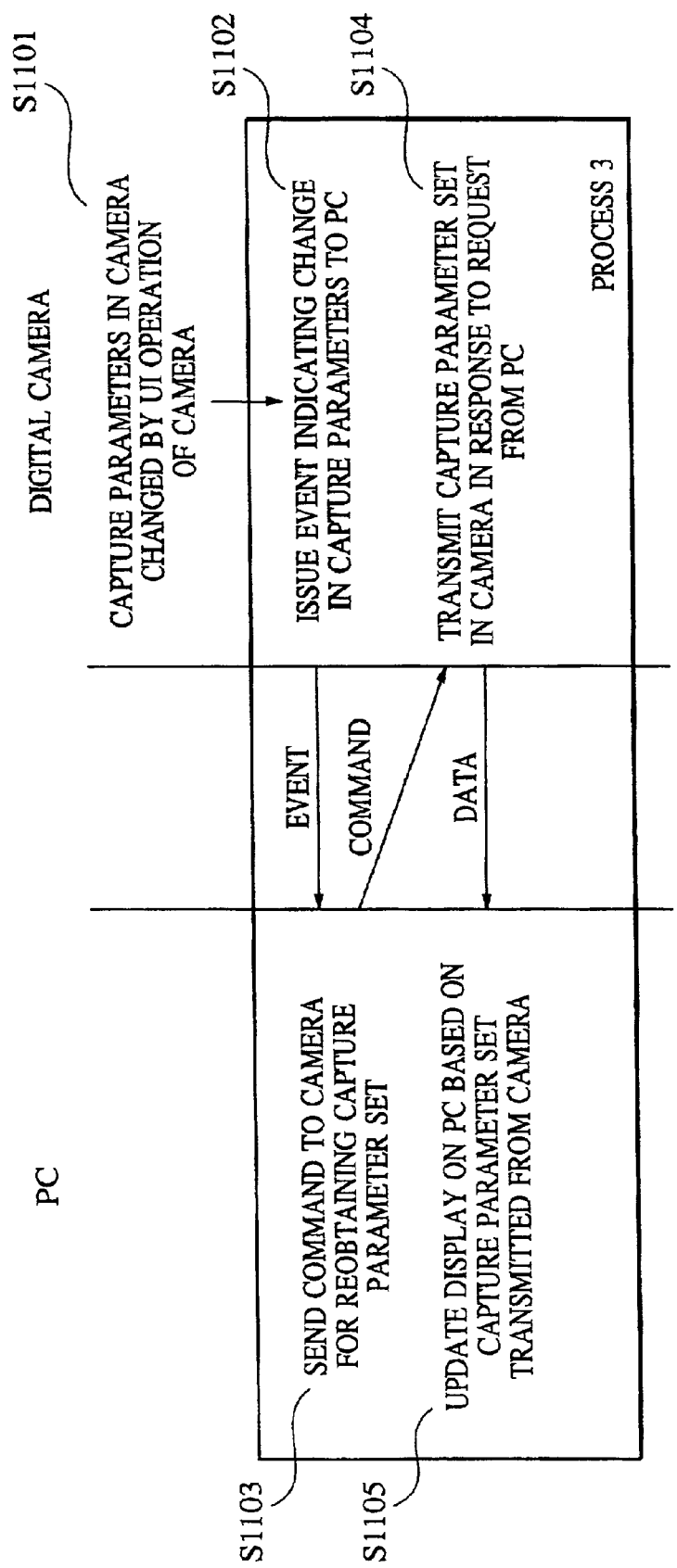
FIG. 11 is a diagram showing a process for changing a capture setting parameter in the digital camera by an operation of the digital camera shown in FIG. 9.

FIG. 11 is a diagram showing a process for changing the capture setting parameters by an operation of the digital camera 901 shown in FIG. 9.

First, by an operation of the UI of the digital camera 901, a change is made to the capture setting of the digital camera 901 (step S1101). Then, the digital camera 901 issues a Change Release Param event to the PC, indicating that a change has been made in the capture setting in the digital camera 901 (step S1102). In a manner similar to the one described earlier, the Change Release Param event also has an Event_ID and an associated parameter. Also in this example, the event shown in (4) of FIG. 4 is generated and transmitted to the PC. In response to the event, the application software on the PC issues a command to the digital camera 901 for obtaining the capture setting parameters in the digital camera 901. As shown in (4) of FIG. 4, the event does not include any parameter information. Thus, the application software on the PC is not allowed to know which of the capture setting parameters in the digital camera 901 has been changed.

FIG. 12 is a diagram showing the capture setting parameters.

As shown in FIG. 12, various capture setting parameters are provided in the digital camera 901, and the application software on the PC is allowed only to know that a change has been made to at least one of the capture setting parameters. Thus, the application software on the PC sends a command to the digital camera 901 for reobtaining the capture setting parameter set in the digital camera 901 (step S1103). In response to the command, the digital camera 901 transmits the new capture setting parameter set to the PC (step S1104). The application software on the PC updates the display based on the new capture setting parameter set received (step S1105).

Also in this example, the process 3 shown in FIG. 10 (steps S1003 to S1006) and the process 3 shown in FIG. 11 (steps S1102 to S1105) are the same. That is, a change to the capture setting of the digital camera 901 can be handled by the same process whether the change is initiated by the application software on the PC or by the UI of the digital camera 901, thus reducing the load of the application software.

Furthermore, also in this example, an event which is issued in response to a change in the capture setting parameters in the digital camera 901 may be the one shown in (5) of FIG. 4. In this case, as opposed to the example above, a parameter indicating which of the capture setting parameters in the digital camera 901 has been changed is included in the event. The below describes an example in which a change is made to the capture setting parameters in the digital camera 901 using the event.

Figure 13:
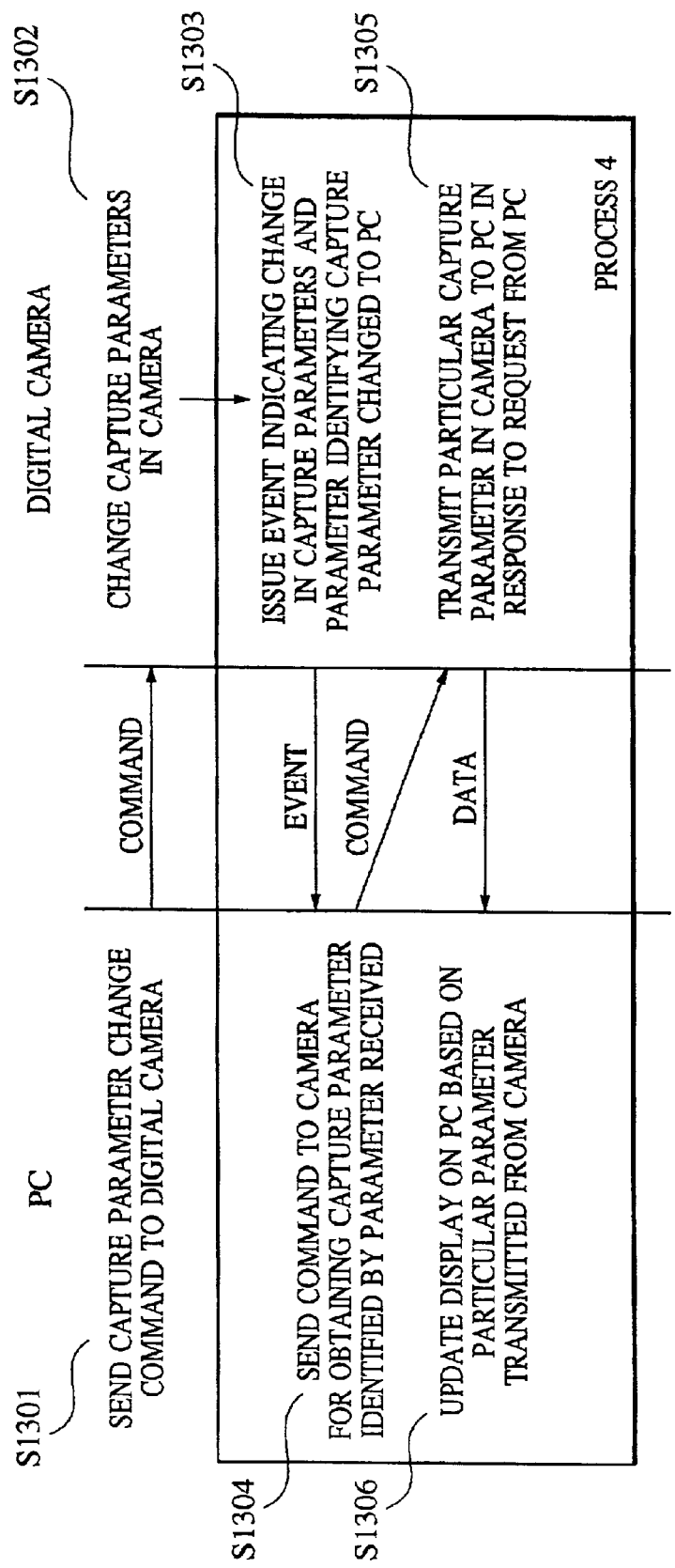
FIG. 13 is a diagram showing a process for changing the capture setting data in the digital camera by an operation of the application software on the PC.

FIG. 13 is a diagram showing a process for changing the capture setting data in the digital camera 901 by an operation of the application software on the PC.

First, by an operation of the application software on the PC, a capture setting parameter change command including a parameter indicating the content of the change is issued to the digital camera 901 (step S1301). In response to the command, the digital camera 901 changes the capture setting (e.g., Tv value shown in FIG. 12) stored therein (step S1302). Then, a Change Release Param event with a parameter indicating the parameter which has been changed (Tv value in the case of (5) in FIG. 4), indicating a change to the capture setting in the digital camera 901, is transmitted to the PC (step S1303). Upon receiving the command and the parameter, the application software on the PC identifies the capture setting parameter which has been changed based on the parameter, and issues a command for obtaining the capture setting parameter from the digital camera 901 (step S1304). In response to the command, the digital camera 901 transmits the specified capture setting parameter to the PC (step S1305). The application software on the PC updates the previous capture setting parameter data stored therein with the new capture setting parameter data received, and also updates the display as required.

Figure 14:
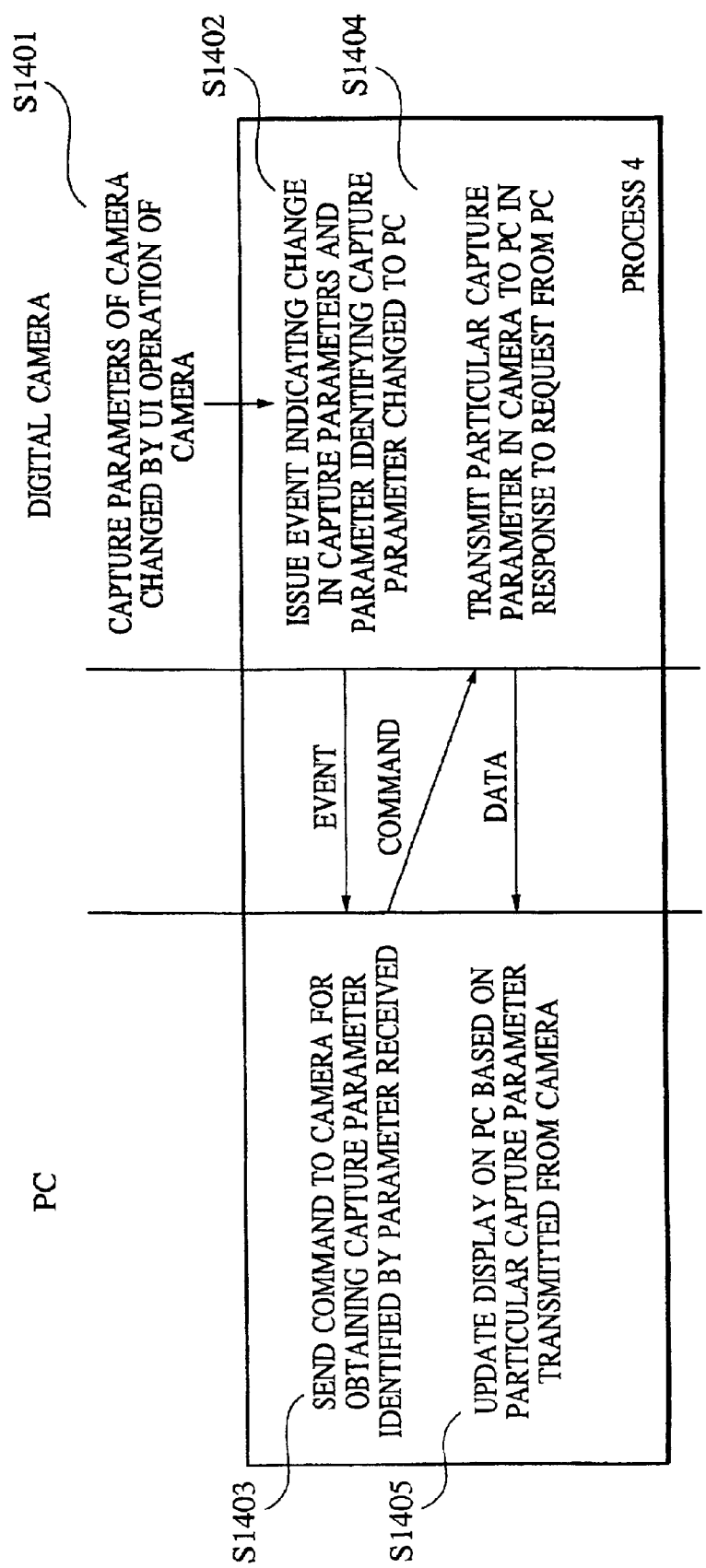
FIG. 14 is a diagram showing a process for changing the capture setting data in the digital camera by an operation of the user interface (UI) of the digital camera.

FIG. 14 is a diagram showing a process for changing the capture setting data in the digital camera 901 by an operation of the UI of the digital camera 901.

First, by an operation of the UI of the digital camera 901, the capture setting (e.g., Tv value in FIG. 12) stored in the digital camera 901 is changed (step S1401). Then, a Change Release Param event indicating a change in the capture setting in the digital camera 901, with a parameter identifying the capture setting parameter which has been changed (Tv value in the case of (5) in FIG. 4), is transmitted to the PC (step S1402). Upon receiving the event and the parameter, the application software on the PC identifies the capture setting parameter which has been changed based on the parameter, and issues a command for obtaining the capture setting parameter from the digital camera 901 (step S1403). In response to the command, the digital camera 901 transmits the specified capture setting parameter to the PC (step S1404). The application software on the PC updates the previous capture setting parameter data stored therein with the new capture setting parameter data received, and also updates the display as required (step S1405).

Also in this example, the process 4 shown in FIG. 13 (steps S1303 to 1306) and the process 4 shown in FIG. 14 (steps S1402 to S1405) are the same. That is, a change to the capture setting can be handled by the same process whether the change is initiated by the application software on the PC or by the UI of the digital camera 901, thus reducing the load of the application software. Furthermore, in this example compared to the example described earlier, although the process is rather complex because the application software must identify the capture setting parameter in the digital camera 901 which has been changed, obtain only the parameter changed, and updates the parameter changed, the performance of the system is improved.

Alternatively, an event which is issued in response to a change in the capture setting parameters in the digital camera 901 may be the one shown in (6) of FIG. 4. In this case, as opposed to the example described earlier, a parameter indicating which of the capture setting parameters in the digital camera 901 has been changed and also indicating the updated value are included in the event. The following describes an example in which a change is made to the capture setting parameters in the digital camera 901 using the event.

Figure 15:
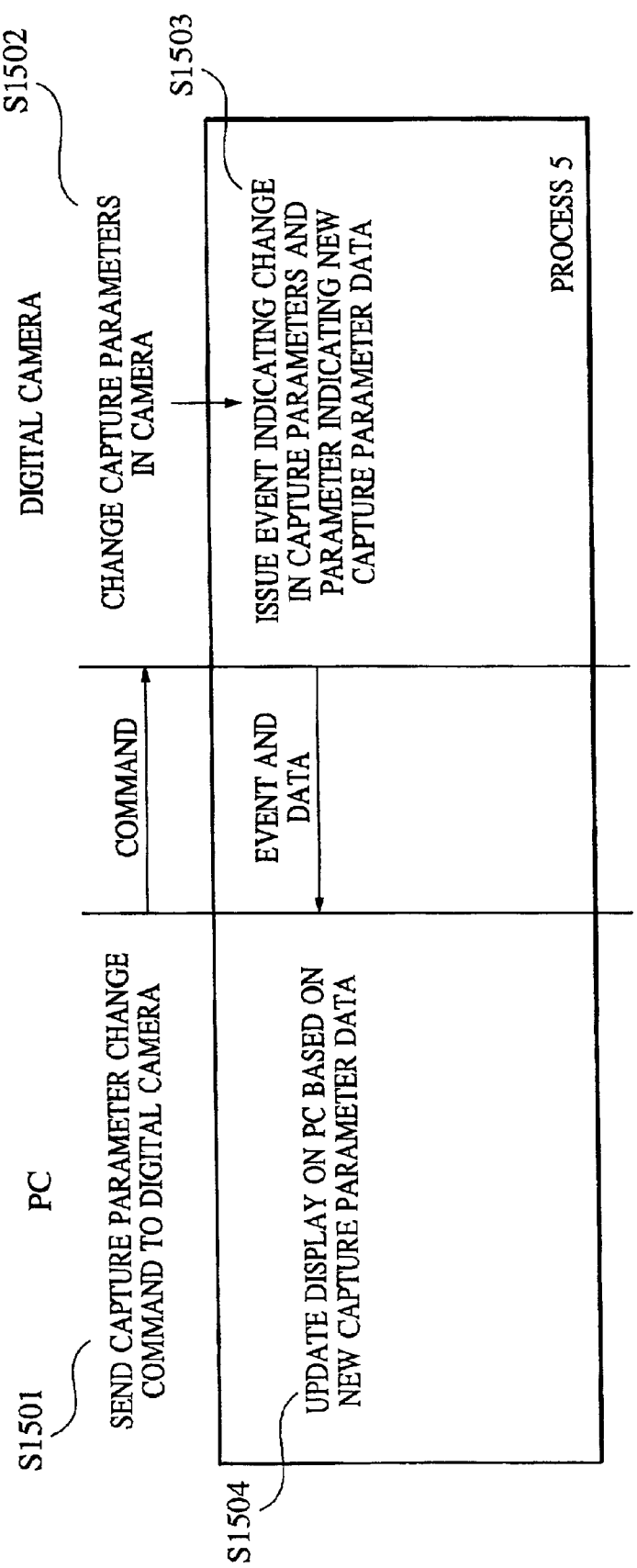
FIG. 15 is a diagram showing a process for changing the capture setting data in the digital camera by an operation of the application software on the PC.

FIG. 15 is a diagram showing a process for changing the capture setting parameters in the digital camera 901 by an operation of the application software on the PC.

Referring to FIG. 15, first, by an operation of the application software on the PC, a capture setting parameter change command including a parameter indicating the content of the change is issued to the digital camera 901 (step S1501). In response to the command, the digital camera 902 changes the capture setting (e.g., Tv value shown in FIG. 12) stored therein (step S1502). Then, a Change Release Param event indicating a change in the capture setting in the digital camera 901, with a parameter indicating the capture setting parameter which has been changed (Tv value parameter with a value of 1/250 in the case of (6) in FIG. 4) is transmitted to the PC (step S1503). Upon receiving the event and the parameter, the application software on the PC identifies the capture setting parameter which has been changed based on the parameter, and updates the previous capture setting parameter data stored therein with the new capture setting parameter data received, and also updates the display as required (step S1504).

Figure 16:
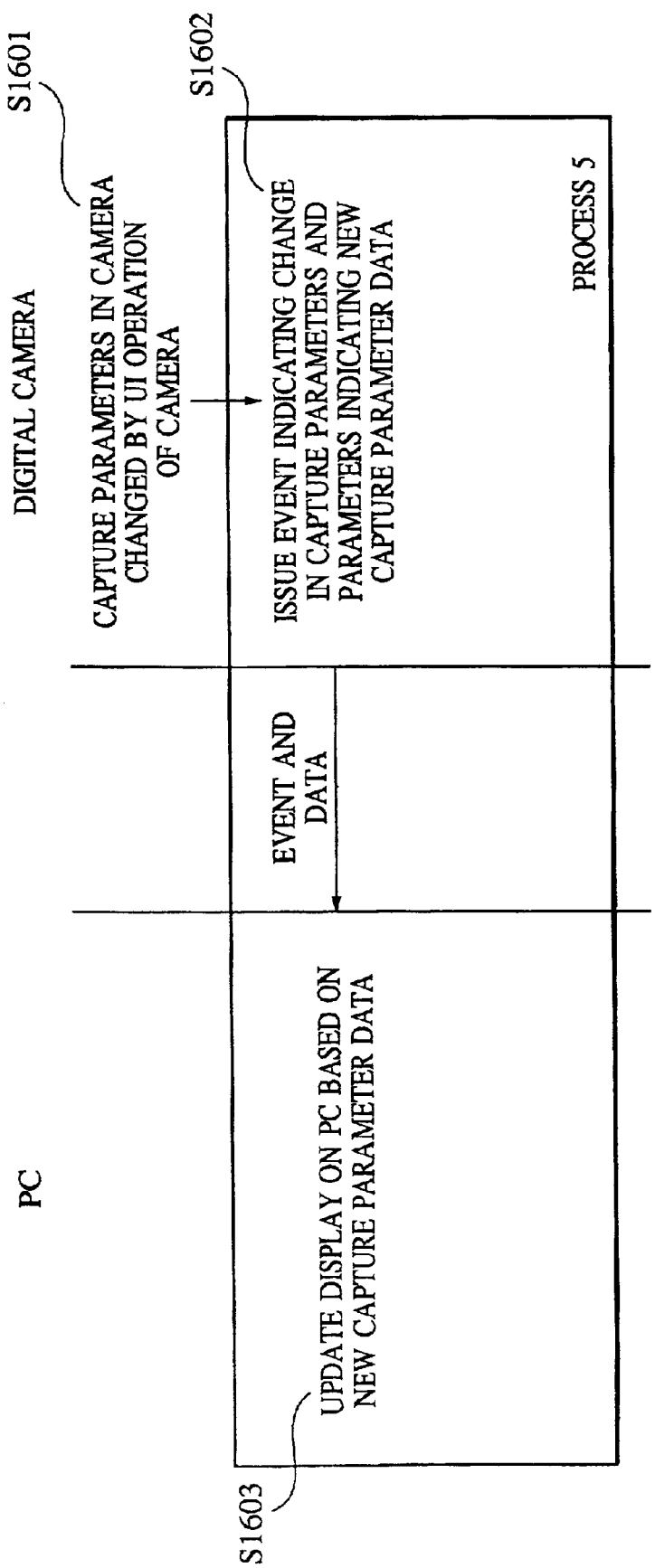
FIG. 16 is a diagram showing a process for changing the capture setting data in the digital camera by an operation of the UI of the digital camera.

FIG. 16 is a diagram showing a process for changing capture setting data in the digital camera 901 by an operation of the UI of the digital camera 901.

First, by an operation of the UI of the digital camera 901, the capture setting (e.g., Tv value shown in FIG. 12) in the digital camera 901 is changed (step S1601). Then, a Change Release Param event indicating a change in the capture setting in the digital camera 901, with a parameter indicating the capture setting parameter which has been changed (Tv value parameter with a value of 1/250 in the case of (6) in FIG. 4), is transmitted to the PC (step S1602). Upon receiving the event and the parameter, the application software on the PC identifies the capture setting parameter which has been changed based on the parameter, updates the previous capture setting parameter data stored therein with the new capture setting parameter data received, and also updates the display as required (step S1603).

Also in this example, the process 5 shown in FIG. 15 (steps S1503 to S1506) and the process 5 shown in FIG. 16 (steps S1602 to S1605) are the same. That is, a change to the capture setting can be handled by the same process whether the change is initiated by the application software on the PC or by the UI of the digital camera 901, thus reducing the load of the application software. Furthermore, in this example, the parameter included in the event generated by the digital camera 901 indicates the capture setting parameter which has been changed and also indicating the value thereof, so that the application software is allowed to identify which of the capture setting parameters in the digital camera 901 has been changed and to update the previous capture setting parameter data with the new capture setting parameter data in the event processing, achieving a highly efficient system. However, because the event including data is transmitted spontaneously from the digital camera 901, the system may not be suitable where data of an excessive size is transmitted, for example, using an interrupt pipe of USB.

Next, a third embodiment of the present invention will be described.

Figure 17:
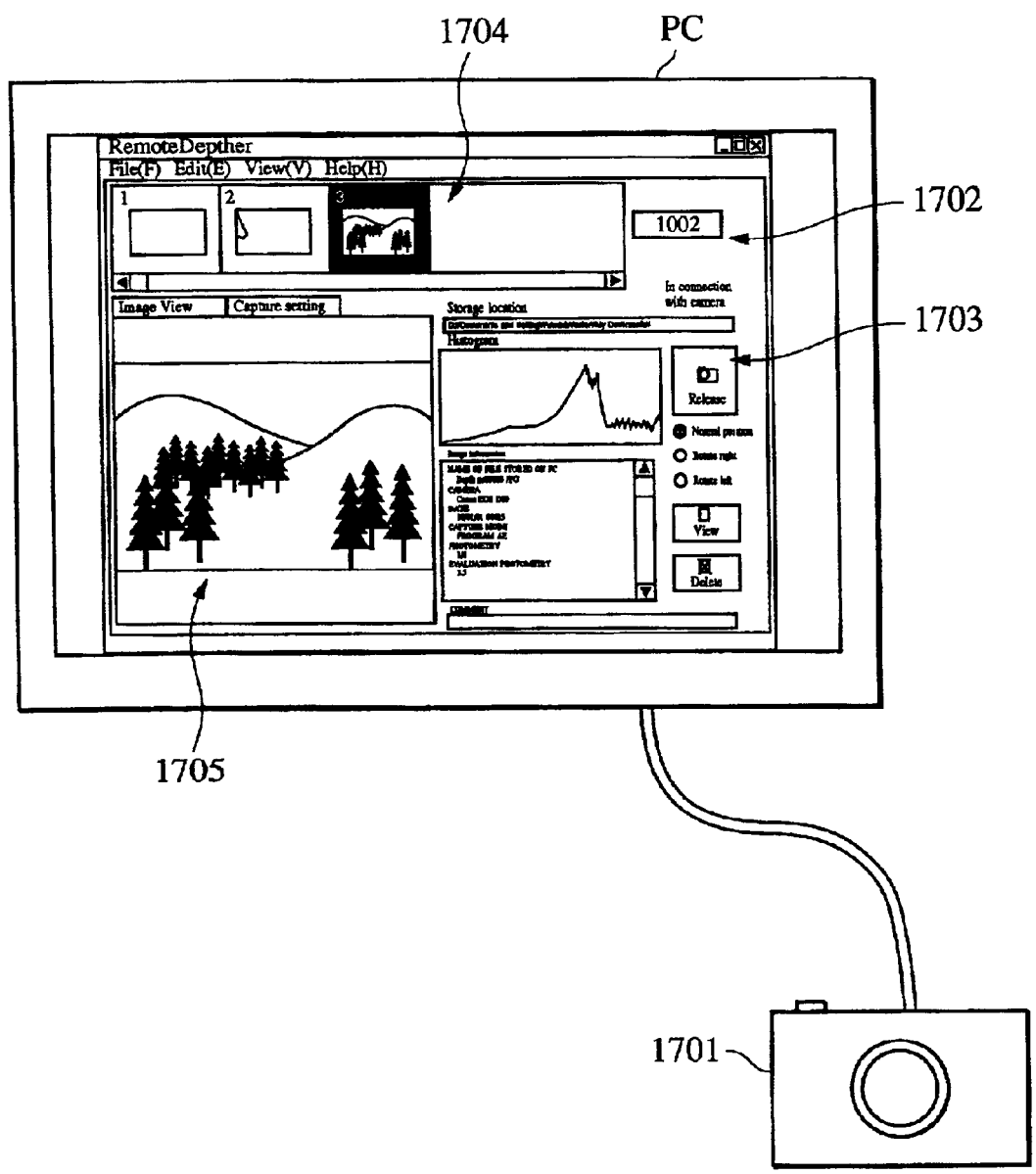
FIG. 17 is a schematic diagram of a third embodiment of the present invention.

FIG. 17 is a schematic diagram showing a digital camera input system according to the third embodiment.

Digital camera 1701 is an information input apparatus, and reference numeral 1702 is an example of application software running on a PC connected to the digital camera 1701 via a USB cable. According to this model, when the digital camera 1701 is connected to the PC via the USB cable, the application software 1702 is activated on the PC, so that the application software 1702 allows capturing of an image by the digital camera 1701 connected to the PC and display of the image captured by a release by the digital camera 1701. Referring to FIG. 17, when the release button 1703 is clicked, a release command is issued to the digital camera 1701 so that the digital camera 1701 captures an image. The image captured is transferred to the PC, so that a thumbnail view is displayed in an area 1704 and the full image is displayed in an area 1705.

The thumbnail image and the full image are displayed similarly when the capture is initiated by an operation of a release switch of the digital camera 1701.

Figure 18:
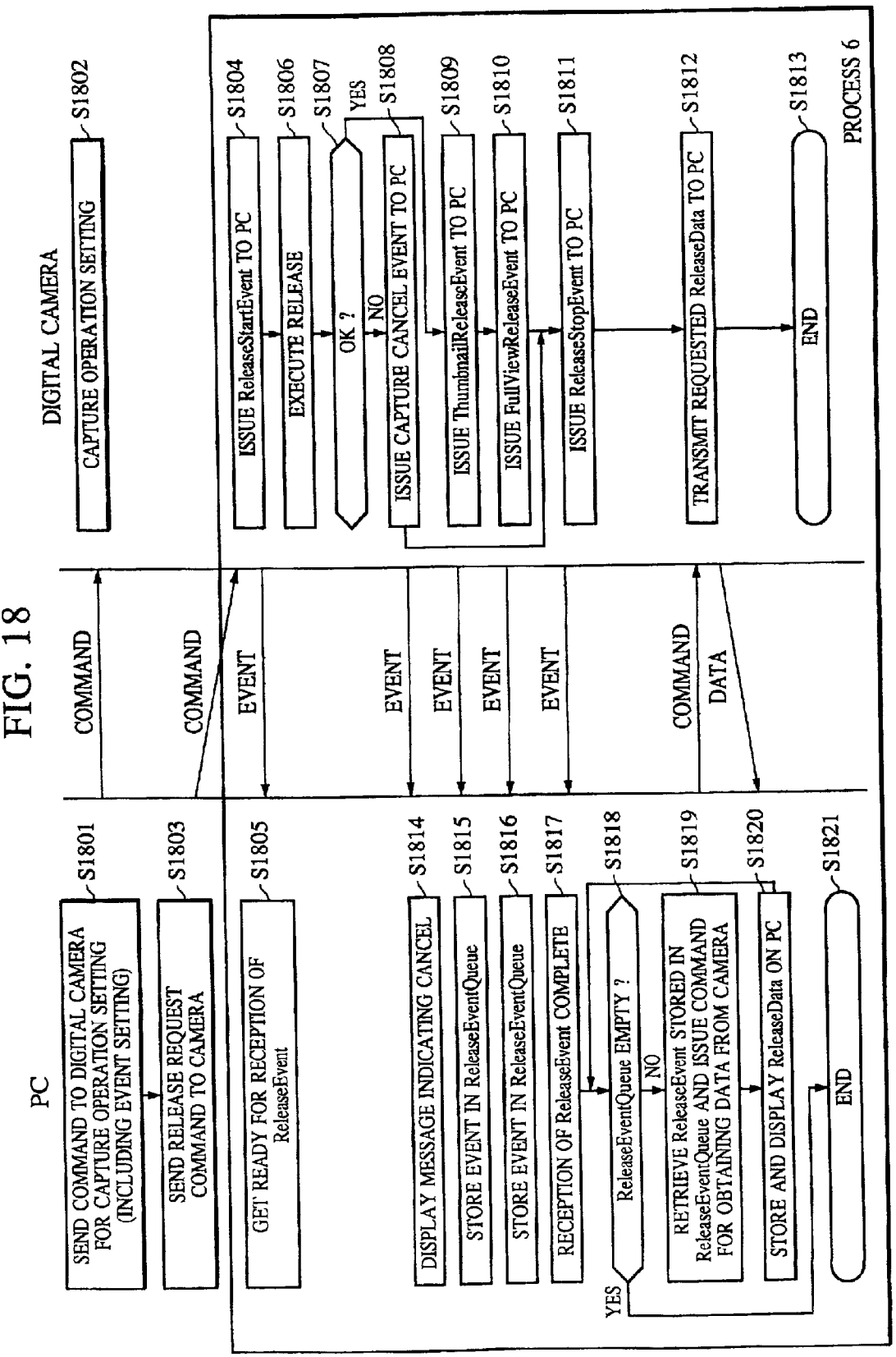
FIG. 18 is a flowchart showing a processing sequence for remotely capturing an image by an operation of the application software on the PC.

FIG. 18 is a flowchart showing a processing sequence for remotely capturing an image by an operation of the application software on the PC. Upon being activated, the application software sends a command for setting an event generation operation for a capture operation of the application software (step S1801).

FIG. 19 is a diagram showing parameters in the event generation setting command for the capture operation.

The command transmitted in step S1801 is configured as shown in FIG. 19A. Referring to FIG. 19A, "NumofEvent" indicates the number of events specified in the command, and "KindOfEvent" indicates the types of the events. "Flag" is set to "True" if the event is desired to be issued, and otherwise set to "False". For example, in this embodiment, "2" is set in "NumOfEvent" and "Thumbnail" and "FullView" are set in "KindOfEvent" with "Flag" both set to "True", so that a thumbnail image and a full image are displayed by the application software.

In response to the command, the digital camera 1701 stores the events for which "True" is set in "Flag", as shown in FIG. 20A (step S1802). Although only a thumbnail image and a full image are used in this embodiment, if the digital camera 1701 records sound, or records an image in the CF (compact flash) card on the digital camera 1701, "Sound", "Save_CF", etc. are stored as an array, as shown in FIG. 20A.

Figure 21:
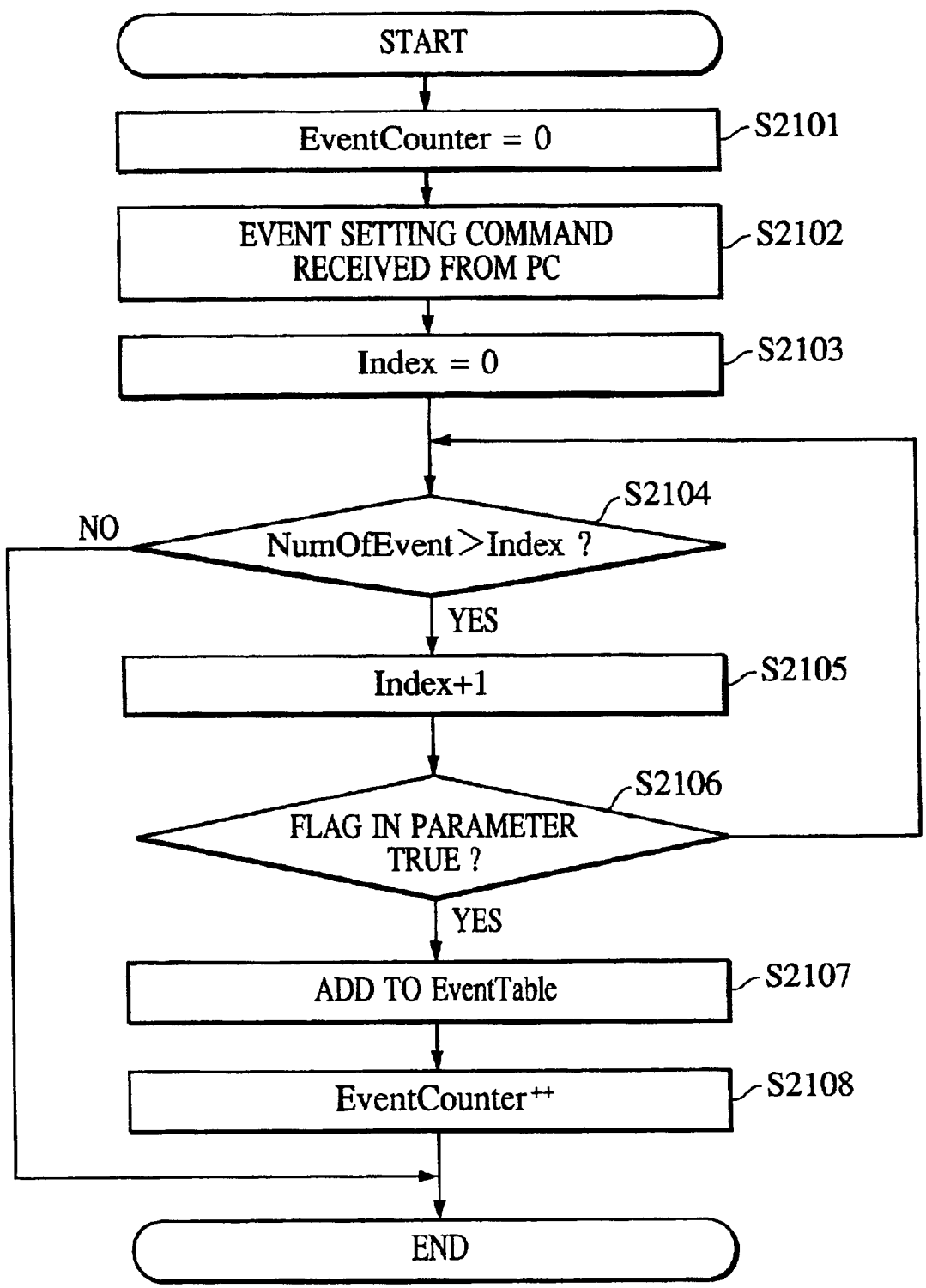
FIG. 21 is a flowchart showing a setting of a capture event.

FIG. 21 is a flowchart showing the processing sequence for the event setting on the side of the digital camera 1701. First, Event_Counter is initialized and cleared to "0" (step S2101). Then, upon reception of the command for setting the event generation operation for the capture operation (step S2402), an "Index" parameter is initialized to "0" (step S2403). Then, it is determined whether the value of "Index" is smaller than the value of "NumOfEvent" (step S2404). If the "Index" value is smaller than the "NumOfEvent" value, the "Index" value is incremented by one (step S2405), it is checked whether "True" is set to "Flag" in the parameter of the received command (step S2406), and events for which "True" is set in "Flag" are added to Event Table (step S2407). Then, the value of the Event Counter is also incremented by one (step S2408).

Steps S2404 to S2408 are repeated to add events to the Event Table until the condition is satisfied.

Referring back to FIG. 18, when the user clicks on the release button 1703 by an operation of the application software on the PC, a release request command is issued to the digital camera 1701 (step S1803). In response to the command, the digital camera 1701 transmits a Release Start event to the PC (step S1804). In response to the event, the application software on the PC gets ready for Release Events to be transmitted from the digital camera 1701 (step S1805), including addition of a queue for queuing the Release Events. The digital camera 1701 then enters a capture operation (step S1806). The capture operation may be cancelled when, for example, auto focus (AF) fails, in which case an event for notifying the PC of the cancel is issued (step S1808).

Figure 22:
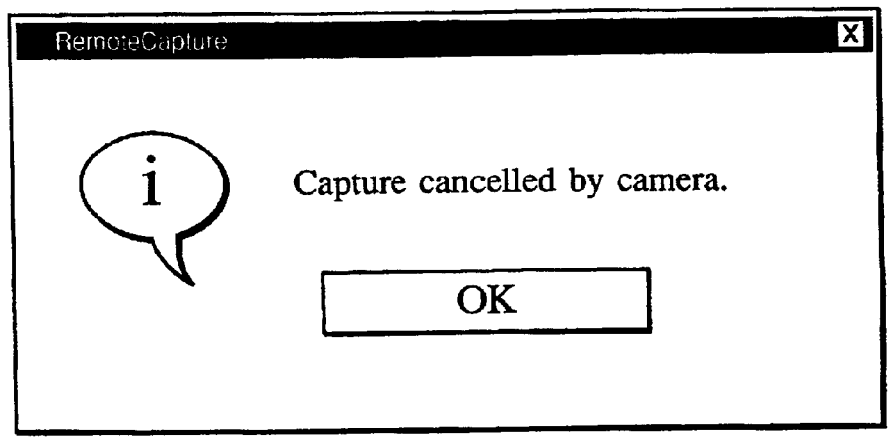
FIG. 22 is an illustration showing a message notifying a cancel of a capture.

Upon reception of the cancel event, the application software on the PC displays a message for alerting the user (step S1814). FIG. 22 is an illustration showing an example of the alerting message.

When the capture operation is successfully completed, the digital camera 1701 sequentially issues the events which have been set in the Event Table. In this example, first, a Thumbnail Release Event is issued to the PC (S1809).

Then, a Full View Release Event is issued (step S1810). The application software on the PC stores each of the events in the Event Queue provided by the PC (steps S1815 and S1816). Then, the digital camera 1701 issues a Release Stop Event to the PC (step S1811), and waits for a data acquisition command from the PC.

Upon reception of the Release Stop Event (step S1817), the application software on the PC determines whether any Release Event is stored in the Event Queue (step S1818), and if there is any, retrieves the event from the Event Queue and issues a command to the digital camera 1701 for requesting data associated with the event (step S1819).

Now, Release Event will be described. Event ID (7) in FIG. 4 shows a Release Event for a thumbnail image, and Event ID (8) in FIG. 4 shows a Release Event for a full image. The events are transmitted with Release Event Param structures as parameters, respectively. The Release Event Param structure is configured, for example, as shown in FIG. 7A. "Sequence ID" is unique identification information of each image data set (e.g., an associated data set including, for example, a thumbnail image, a full image, and speech) captured by the digital camera 1701. Each data element of the data set has the same Sequence ID.

"Data Size" indicates the size of the data notified by the event. For example, if the event is for a thumbnail image, "Data Size" indicates the data size of the thumbnail image. "Data Format" indicates the data format, etc. of the data notified by the event.

When the data acquisition command for obtaining the data notified by the Release Event is issued to the digital camera 1701 in step S1819, the Sequence_ID is used as a parameter. The digital camera 1701 searches the data stored therein based on the Sequence_ID to identify the corresponding data, and transmits the data to the PC (step S1812). The application software on the PC is thus allowed to store and display the data received (step S1820).

Figure 23:
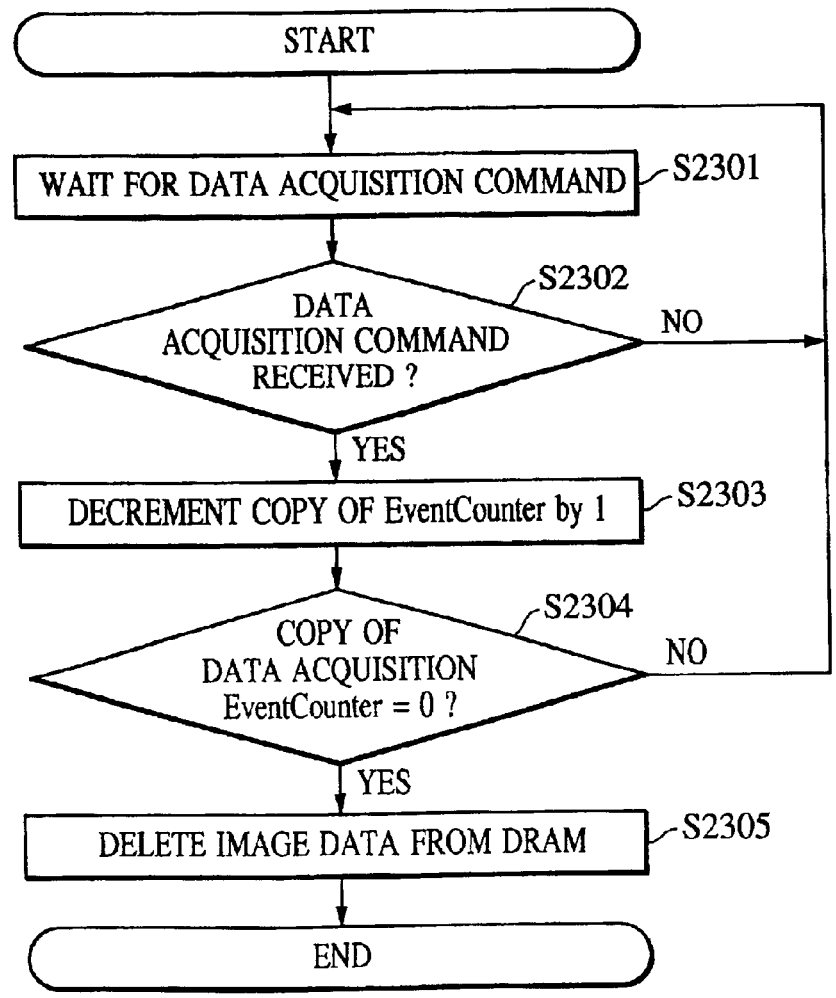
FIG. 23 is a flowchart showing a process for deleting image data on a DRAM.

FIG. 23 is a flowchart showing a process for deleting data stored in the digital camera 1701 by an operation of the digital camera 1701.

The digital camera 1701 stores data sets captured in response to a release command from the application software on the PC in a primary storage device such as a DRAM in the digital camera 1701, and deletes the data when transfer of the data is completed. The data is managed by the unit of each data set, and thus a series of data elements are deleted together when deleting data. For this reason, a data set is deleted when all the data required has been completely transferred. In order to achieve this, a copy of the value of the Event_Counter is assigned to the Sequence_ID.

Initially, the digital camera 1701 waits for a data acquisition command from the PC (step S2301), and upon receiving a data acquisition command (step S2302), the digital camera 1701 decrements the value of the Event_Counter by 1 (step S2303).

Next, it is determined whether the value of the Event_Counter is "0" (step S2304), and if the value is "0", the data set is deleted from the DRAM (step S2305), and the process is exited. If the value of the Event_Counter is not "0", it means that data to be acquired from the PC still exists, so the digital camera 1701 waits for the next data acquisition command.

In this example, the data in the digital camera 1701 is managed by the unit of each data set, and thus each data set must be deleted altogether when the data set is deleted. However, if the image data is managed by the unit of each data element, the image data may be deleted from the DRAM by the unit of each data element. Furthermore, as will be described later, if a single piece of data is used by a plurality of clients (for example, when a thumbnail image is to be used by a plurality of application software), instead of the Event_Counter, counters may be provided individually for each of the data elements, so that each of the data elements will be deleted from the DRAM when the value of the corresponding counter becomes "0".

Figure 24:
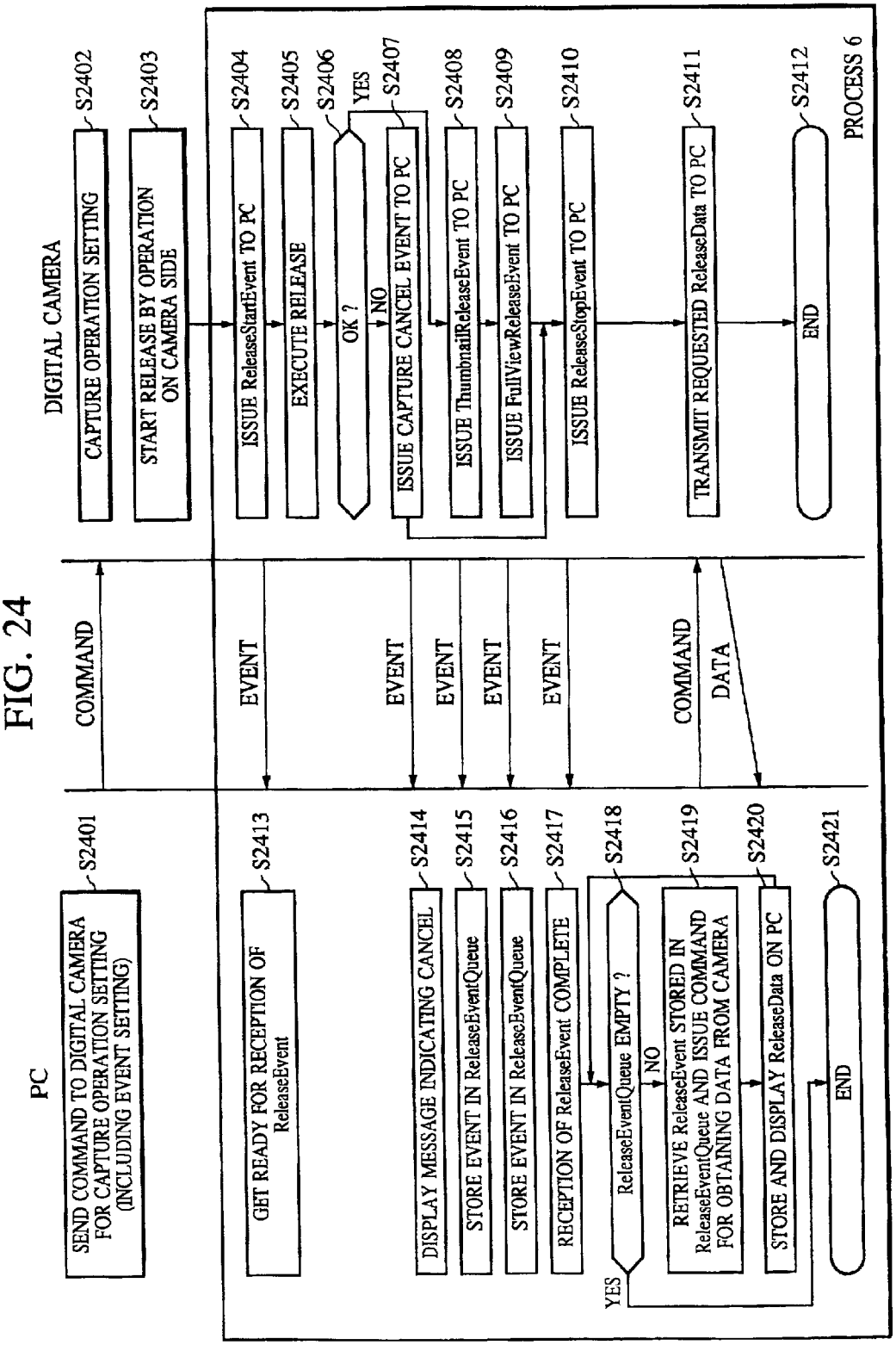
FIG. 24 is a flowchart showing a release operation initiated by an operation of the digital camera.

FIG. 24 is a flowchart showing a process for capturing an image by an operation of the UI of the digital camera 1701, so that the data is displayed and stored by the application software on the PC. In a manner similar to the case described earlier, in which the release operation is initiated by the application software on the PC, the application software, upon being activated, sends a command to the digital camera 1701 for setting an event generation operation for a capture operation (step S2401). The command is configured, for example, as shown in FIG. 19A.

The processing sequence for the event setting is the same as in the case where the release operation is initiated by the application software on the PC.

Then, the release operation is entered by pushing the release switch of the digital camera 1701 (step S2403). Then, the digital camera 1701 transmits a Release Start Event to the PC (step S2404). In response to the event, the application software on the PC gets ready for receiving Release Events to be transmitted from the digital camera 1701 (step S2413), including addition of a queue for queuing the Release Events. The digital camera 1701 then enters a capture operation (step S2405), and if, for example, AF (auto focus) fails, the capture operation is cancelled, and an event for notifying the PC of the cancel of the capture operation is issued to the PC (step S2407).

In response to the cancel event, the application software alerts the user by displaying a message, for example, as shown in FIG. 22 (step S2414).

When the digital camera 1701 successfully completes the capture operation, the events which have been set in the Event Table are sequentially issued. In this example, a Thumbnail Release Event is first issued to the PC (step S2408).

Next, a Full View Release Event is issued (step S2409). In response to the events, the application software on the PC stores the events in the Event Queue provided by the PC (steps S2415 and S2416). Then, the digital camera 1701 issues a Release Stop Event to the PC (step S1811), and waits for a data acquisition command from the PC.

Upon receiving the Release Stop Event (step S2417), the application software checks if any Release Event is stored in the Event Queue (step S2418), and if there is any, the application software retrieves the event from the Event Queue, and sends a command to the digital camera 1701 for requesting the associated data (step S2419). The Release Event is the same as in the case described earlier, in which the release operation is initiated by the application software.

When the data acquisition command for obtaining data specified in the Release Event is transmitted to the digital camera 1701 in step S2419, the Sequence_ID is used as a parameter. The digital camera 1701 searches the data stored therein based on the Sequence_ID to identify the corresponding data, and transmits the data (step S2411). The application software on the PC is thus allowed to store and display the data received (step S2420).

In this example, the Release Start Event is issued when the release switch of the digital camera is switched on (half depressed), and the Release Stop Event is issued when the release switch is switched off, so that the same processing sequence on the PC can be used for both the single frame capture mode and the continuous frames capture mode. When in the continuous frames capture mode, the application software on the PC queues Release Events received between the Release Start Event and the Release Stop Event, sequentially retrieves the events from the queue after the Release Stop Event, and identifies and obtains the data. Thus, in the continuous frames capture mode, a series of Release Events received between the Release Start Event and the Release Stop Event is transmitted to the PC, and the PC processes the Release Events in the same manner as in the single frame capture mode.

Also in the third embodiment, the process 6 shown in FIG. 18 (steps S1804 to S1821) and the process 6 shown in FIG. 24 (steps S2404 to S2421) are the same. That is, capturing and transfer of data can be executed by the same processing sequence whether the operation is initiated by the UI of the digital camera 1701 or by the application software on the PC, thus reducing the load of the application software 1702 and allowing flexible operation.

Alternatively, the information added to the command for setting an event generation operation for the capture operation of the digital camera 1701 may be configured as shown in FIG. 19B. In this case, an "Add" field is added to the example described earlier. The "Add" field stores information which identifies the destination of the event. In this case, events are stored in the event table on the digital camera 1701 as shown in FIG. 20B.

Destination addresses are assigned to each of the events, so that the events can be transmitted to their respective destination addresses. Thus, the same information (e.g., a thumbnail image) can be requested from a plurality of processes in a multiple client environment.

Furthermore, a Release Event Param structure which is added to a Release Event may be configured as shown in FIG. 7B or FIG. 7C. In FIG. 7B, an "Internal File Path" field is added, in which, when data is transferred to the PC and also stored in a secondary storage device such as a CF in the digital camera 1701, information which allows identification of the data in the digital camera 1701 (e.g., a file path) is stored. The application software on the PC is thus allowed to compare data in the digital camera 1701 and the data transferred to the PC based on the information. FIG. 7C shows a configuration which uses the Internal File Path instead of the Sequence_ID, which can be used when data is transferred to the PC only after the data has been stored in the secondary storage device such as a CF in the digital camera 1701.

The present invention has been described hereinabove with three embodiments. In all, the updating operation, etc. on the side of the application software can be executed in the same manner whether the operation is initiated by an operation of the application software on the PC or by an operation of the UI of the digital camera.

Figure 25:
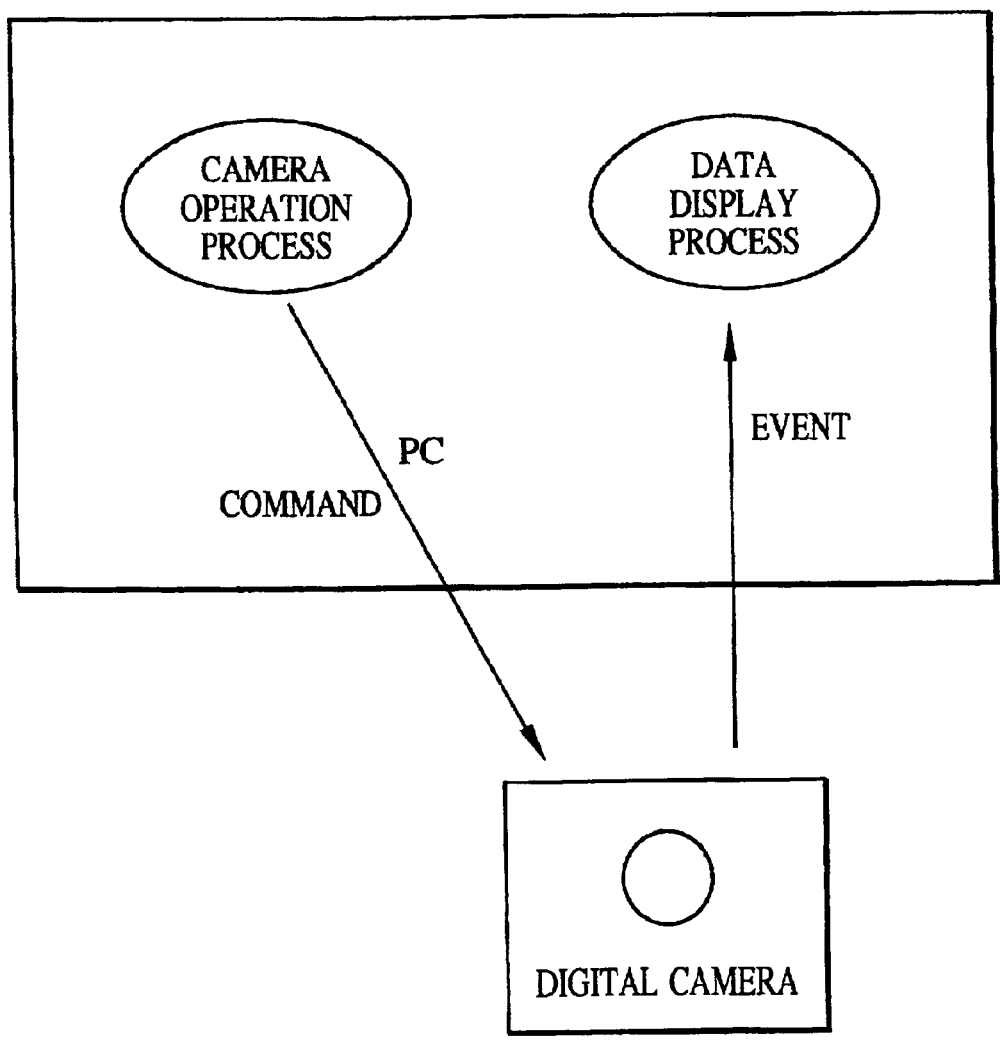
FIG. 25 is a diagram showing an example in which control process and display process are made independent of each other.
Figure 26A:
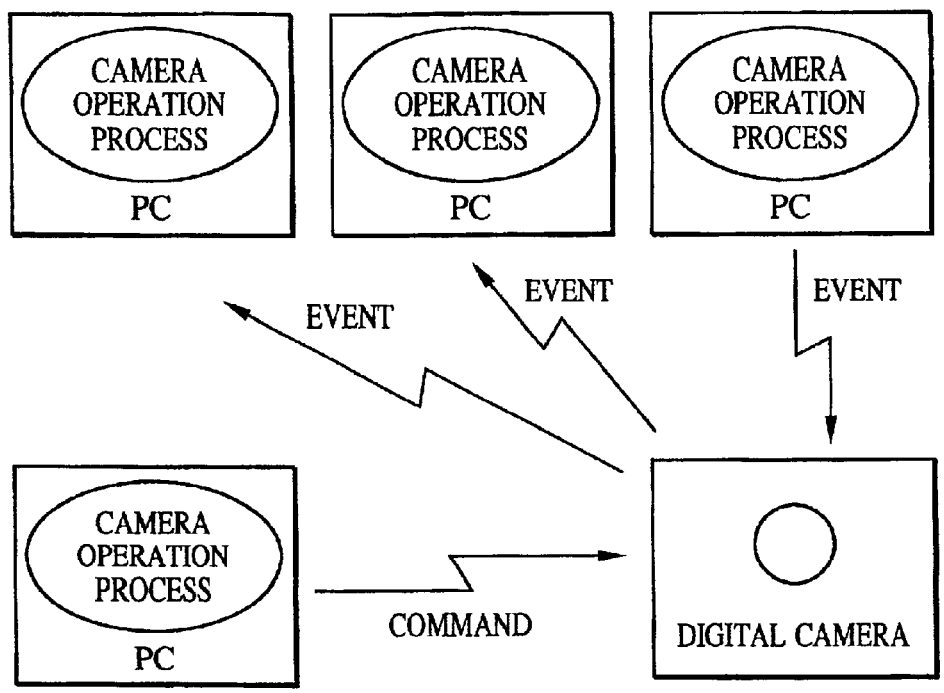
FIGS. 26A and 26B are schematic diagrams showing examples in which control process and display process are distributed on a plurality of PCs.

Taking a step further, as shown in FIG. 25, camera operation process and data display process (data processing process) can be readily implemented as separate processes (or threads). Thus, the data display process (data processing process) is executed only in response to an event from the camera, and executed in the same manner regardless of the cause of the event. Thus, the camera operation process and the data display process (data processing process) become highly independent of each other. For example, as shown in FIG. 26A, the camera operation process and the data display process (data processing process) may be executed on different PCs.

Figure 26B:
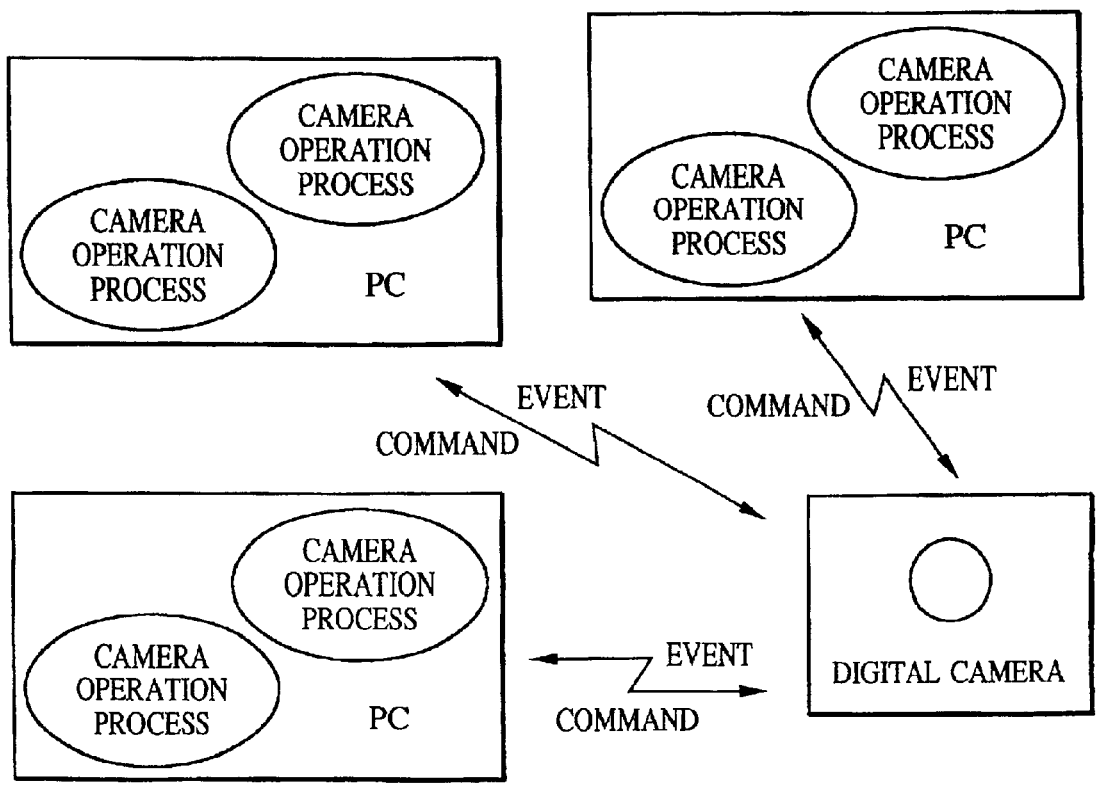

Furthermore, as shown in FIG. 26B, a system in which a number of application software programs may run on a plurality of PCs, so that operation of the camera and display of data are handled with consistency, can be implemented relatively easily.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A digital camera system comprising a digital camera, and a computer which is connected to said digital camera and which controls said digital camera, said digital camera having:

a capture unit arranged to capture an image; and an image storing unit arranged to store the captured image in a memory; said computer having:

a command issuing unit arranged to issue a capture command for capturing an image by said digital camera or a delete command for deleting the image stored in said memory;

wherein said digital camera generates an event signal indicating a change in the content stored in said memory by a common sequence when the content stored in said memory is changed in response to said capture command or said delete command and when the content stored in said memory is changed in response to an operation of said digital camera; and said computer issues a control command for collecting the content stored in said memory by a common sequence in response to said event signal when the content stored in said memory is changed in response to said capture command or said delete command and when the content stored in said memory is changed in response to an operation of said digital camera.

2. A digital camera which is connectable to a computer, said digital camera comprising:

a capture unit arranged to capture an image;

an image storing unit arranged to store the captured image in a memory;

a release switch arranged to request a capture to said capture unit;

an operation unit arranged to request deletion of the image stored in said memory; and a control unit arranged to control said capture unit or said image storing unit upon receipt of a capture command or a delete command from a computer connected to said digital camera;

wherein said control unit generates an event signal indicating a change in the content stored in said memory by a common sequence when the content stored in said memory is changed in response to a capture by said release switch or an operation of said operation unit and when the content stored in said memory is changed in response to said capture command or said delete command.

3. A method of controlling a computer which is connected to a digital camera and which controls said digital camera, said method comprising:

a first issuing step of issuing a capture command for capturing an image by said digital camera or a delete command for deleting an image stored in a memory of said digital camera;

a receiving step of receiving event information indicating a change in the content stored in the memory of said digital camera from said digital camera; and a second issuing step of issuing a control command for collecting the content stored in said memory by a common sequence when said event information is issued in relation to a capture or deletion of image being executed in response to the command issued in said first issuing step and when said event information is issued in relation to a capture or deletion of image being executed in response to an operation of an operation unit of said digital camera.

4. A digital camera which is connectable to a computer, said digital camera comprising:

first transmitting means that transmits event information relating to an operation executed in said digital camera to said computer; and second transmitting means that transmits data having been changed by said operation to said computer;

wherein said first transmitting means transmits common event information when said operation is initiated by a command from said computer and when said operation is initiated by an input from an operation unit of said digital camera.

5. A method of controlling a computer which is connectable to a digital camera, said method comprising:

a first transmitting step for transmitting a command for executing a predetermined operation by said digital camera;

a receiving step for receiving event information relating to the operation executed by said digital camera in response to the command transmitted; and a second transmitting step for transmitting a processing request to said digital camera in accordance with the event information received;

wherein said second transmitting step transmits the same processing request when said event information is generated in relation to said predetermined operation being executed in response to an input from an operation unit of said digital camera.

6. A control method of controlling a digital camera connectable to a computer, the control method comprising:

a first step of deleting image data according to a command from the computer;

a second step of deleting image data according to instructions inputted in the digital camera; and a third step of sending a first event information to the computer if the first step is performed, and sending a second event information to the computer if the second step is performed, wherein the first and second event information include common information, and the first and second event information are indications that a predetermined event has occurred in the digital camera.

7. A digital camera which is controlled by a control method according to claim 6.

8. A control method according to claim 6, wherein the common information includes an event ID corresponding to the predetermined event occured in the digital camera.

9. A control method of controlling a digital camera connectable to a computer, the control method comprising:

a first step of changing a property of image data according to a command from the computer;

a second step of changing a property of image data according to instructions inputted in the digital camera; and a third step of sending a first event information to the computer if the first step is performed, and sending a second event information to the computer after the second step is performed, wherein the first and second event information include common information, and the first and second event information are indications that a predetermined event has occurred in the digital camera.

10. A digital camera which is controlled by a control method according to claim 9.

11. A control method according to claim 9, wherein the common information includes an event ID corresponding to the predetermined event occurred in the digital camera.

12. A control method of controlling a digital camera connectable to a computer, the control method comprising:
   a first step of changing setting of the digital camera according to a command from the computer;
   a second step of changing setting of the digital camera according to instructions inputted in the digital camera; and
   a third step of sending a first event information to the computer if the first step is performed, and sending a second event information to the computer if the second step is performed,
   wherein the first and second event information include common information, and
   the first and second event information are indications that a predetermined event has occurred in the digital camera.

13. A digital camera which is controlled by a control method according to claim 12.

14. A control method according to claim 12, wherein the common information includes an event ID corresponding to the predetermined event occurred in the digital camera.

15. A control method of controlling a digital camera connectable to a computer, the control method comprising:
   a first step of starting capturing an image according to a command from the computer;
   a second step of starting capturing an image according to instructions inputted in the digital camera; and
   a third step of sending a first event information to the computer if the first step is performed, and of sending a second event information to the computer if the second step is performed,
   wherein the first and second event information include common information, and
   the first and second event information are indications that a predetermined event has occurred in the digital camera.

16. A digital camera which is controlled by a control method according to claim 15.

17. A control method according to claim 15, wherein the common information includes an event ID corresponding to the predetermined event occurred in the digital camera.

18. An apparatus connectable to a computer and capable of operating as a digital camera, the apparatus comprising:
   a control unit adapted to control the apparatus so as to delete image data according to a command from the computer or instructions inputted in the apparatus,
   wherein the control unit is adapted to control the apparatus so as to send a first event information to the computer if the apparatus deletes image data according to the command from the computer, and control the apparatus so as to send a second event information to the computer if the apparatus deletes image data according to the instructions inputted in the apparatus,
   the first and second event information include common information, and
   the first and second event information are indications that a predetermined event has occurred in the apparatus.

19. An apparatus according to claim 18, wherein the common information includes an event ID corresponding to the predetermined event occurred in the apparatus.

20. An apparatus connectable to a computer and capable of operating as a digital camera, the apparatus comprising:
   a control unit adapted to control the apparatus so as to change a property of image data according to a command from the computer or instructions inputted in the apparatus,
   wherein the control unit is adapted to control the apparatus so as to send a first event information to the computer if the apparatus changes a property of image data according to the command from the computer, and control the apparatus so as to send a second event information to the computer if the apparatus changes a property of image data according to the instructions inputted in the apparatus,
   the first and second event information include common information, and
   the first and second event information are indications that a predetermined event has occurred in the apparatus.

21. An apparatus according to claim 20, wherein the common information includes an event ID corresponding to the predetermined event occurred in the apparatus.

22. An apparatus connectable to a computer and capable of operating as a digital camera, the apparatus comprising:
   a control unit adapted to control the apparatus so as to change setting of the apparatus according to a command from the computer or instructions inputted in the apparatus,
   wherein the control unit is adapted to control the apparatus so as to send a first event information to the computer if the apparatus changes setting of the apparatus according to the command from the computer, and control the apparatus so as to send a second event information to the computer if the apparatus changes setting of the apparatus according to the instructions inputted in the apparatus,
   the first and second event information include common information, and
   the first and second event information are indications that a predetermined event has occurred in the apparatus.

23. An apparatus according to claim 22, wherein the common information includes an event ID corresponding to the predetermined event occurred in the apparatus.

24. An apparatus connectable to a computer and capable of operating as a digital camera, the apparatus comprising:
   a control unit adapted to control the apparatus so as to start capturing an image according to a command from the computer or instructions inputted in the apparatus,
   wherein the control unit is adapted to control the apparatus so as to send a first event information to the computer if the apparatus starts capturing an image according to the command from the computer, and control the apparatus so as to send a second event information to the computer if the apparatus starts capturing an image according to the instructions inputted in the apparatus,
   the first and second event information include common information, and
   the first and second event information are indications that a predetermined event has occurred in the apparatus.

25. An apparatus according to claim 24, wherein the common information includes an event ID corresponding to the predetermined event occurred in the apparatus.

* * * * *